(12) United States Patent
Kono et al.

(10) Patent No.: US 9,229,293 B2
(45) Date of Patent: Jan. 5, 2016

(54) SEMICONDUCTOR OPTICAL DEVICE AND METHOD FOR MANUFACTURING SEMICONDUCTOR OPTICAL DEVICE

(71) Applicant: SUMITOMO ELECTRIC INDUSTRIES, LTD., Osaka-shi, Osaka (JP)

(72) Inventors: Naoya Kono, Yokohama (JP); Hideki Yagi, Machida (JP); Takamitsu Kitamura, Fujisawa (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/454,951

(22) Filed: Aug. 8, 2014

(65) Prior Publication Data
US 2015/0043867 A1    Feb. 12, 2015

(30) Foreign Application Priority Data

Aug. 9, 2013 (JP) .................................. 2013-166946

(51) Int. Cl.
| | |
|---|---|
| *G02B 6/26* | (2006.01) |
| *G02F 1/225* | (2006.01) |
| *G02B 6/122* | (2006.01) |
| *G02B 6/136* | (2006.01) |
| *G02F 1/21* | (2006.01) |
| *G02B 6/293* | (2006.01) |

(52) U.S. Cl.
CPC ............ *G02F 1/2257* (2013.01); *G02B 6/1228* (2013.01); *G02B 6/136* (2013.01); *G02B 6/29352* (2013.01); *G02B 6/2938* (2013.01); *G02F 2001/212* (2013.01); *G02F 2001/217* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,310,995 | B1 | 10/2001 | Saini et al. | |
| 2004/0120648 | A1* | 6/2004 | Kwon | .................. G02B 6/1228 385/43 |
| 2006/0285797 | A1* | 12/2006 | Little | .................... G02B 6/305 385/43 |
| 2007/0171515 | A1* | 7/2007 | Kang | ...................... H01S 5/026 359/333 |
| 2012/0321244 | A1* | 12/2012 | Suzuki | ................... G02B 6/305 385/14 |
| 2013/0266263 | A1* | 10/2013 | Kwon | .................. G02B 6/1228 385/43 |
| 2015/0086153 | A1* | 3/2015 | Ono | .................... G02B 6/1228 385/11 |

FOREIGN PATENT DOCUMENTS

JP    2011-039262    2/2011

* cited by examiner

*Primary Examiner* — Hemang Sanghavi
(74) *Attorney, Agent, or Firm* — Smith, Gambrell & Russell LLP.

(57) ABSTRACT

A method for manufacturing a semiconductor optical device includes the steps of growing a stacked layer including lower and upper core layers, a first upper region including a non-doped layer, a second upper region including a p-type layer, and a cap layer; forming an upper mesa by etching the stacked layer; selectively etching the cap layer in the upper mesa on the first and second regions; forming a mask on the upper mesa in the second and third regions; and etching the upper mesa using the mask so as to form first to fourth mesa portions. The first and fourth mesa portions are formed by etching the first and second upper regions, and the second upper region and the cap layer, respectively. The second and third mesa portions are formed by etching the first and second upper regions, and the second upper region and the cap layer, respectively.

16 Claims, 27 Drawing Sheets

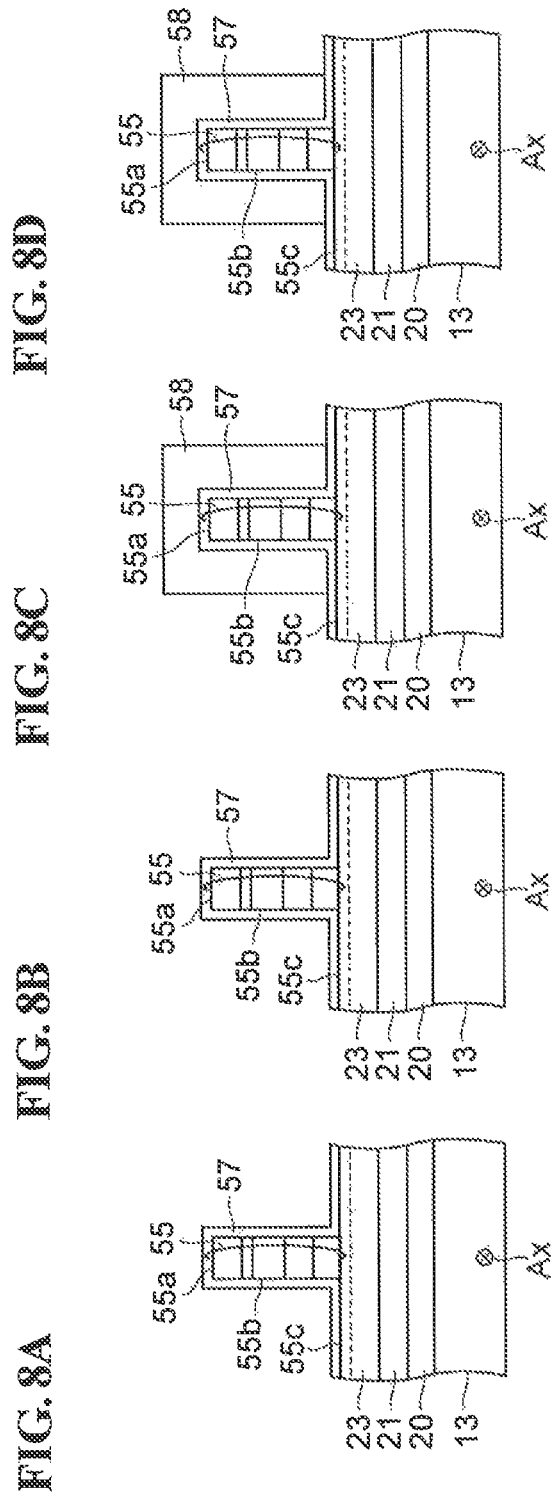

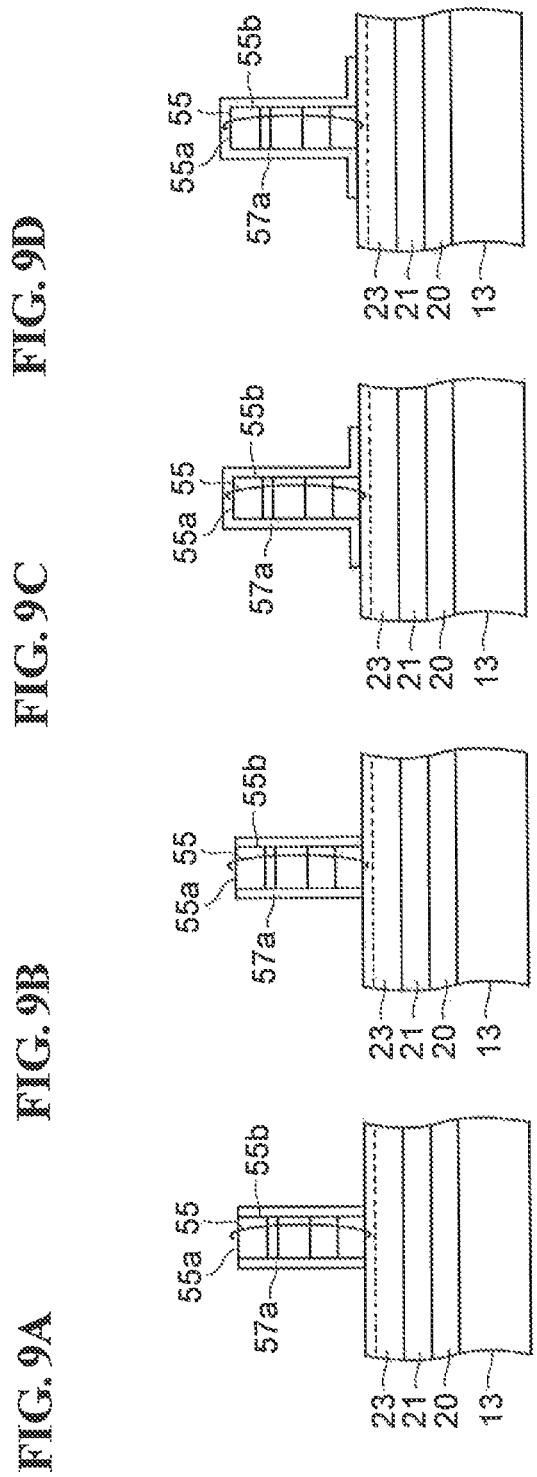

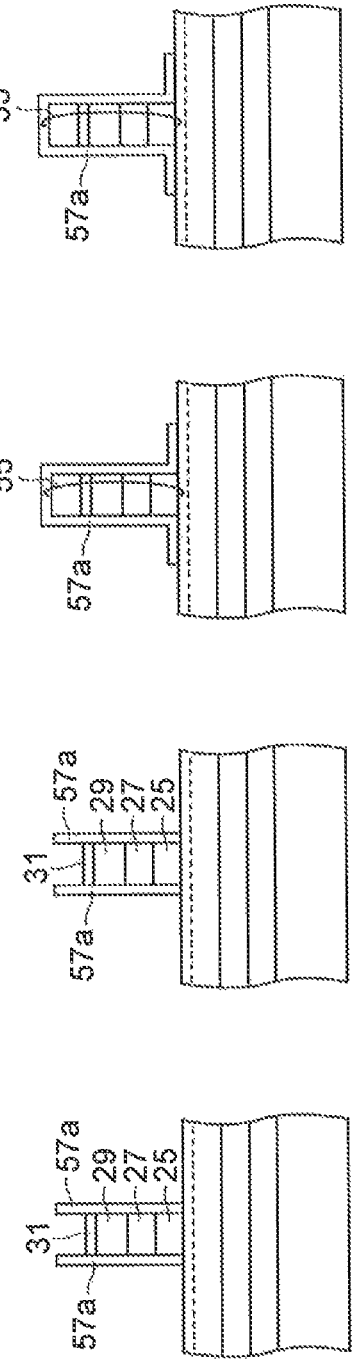

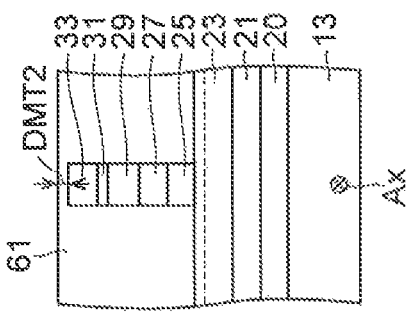
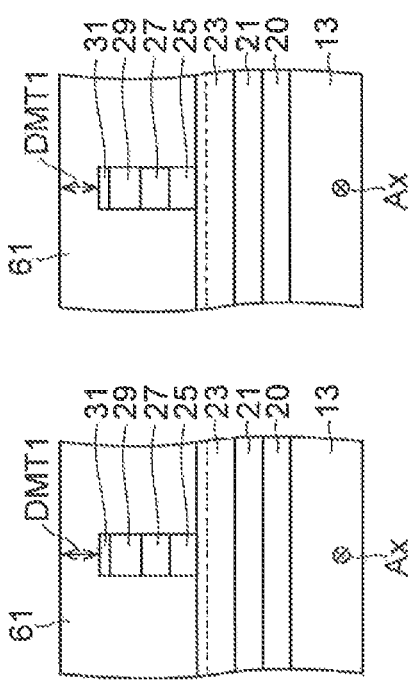
FIG. 12A  FIG. 12B  FIG. 12C  FIG. 12D

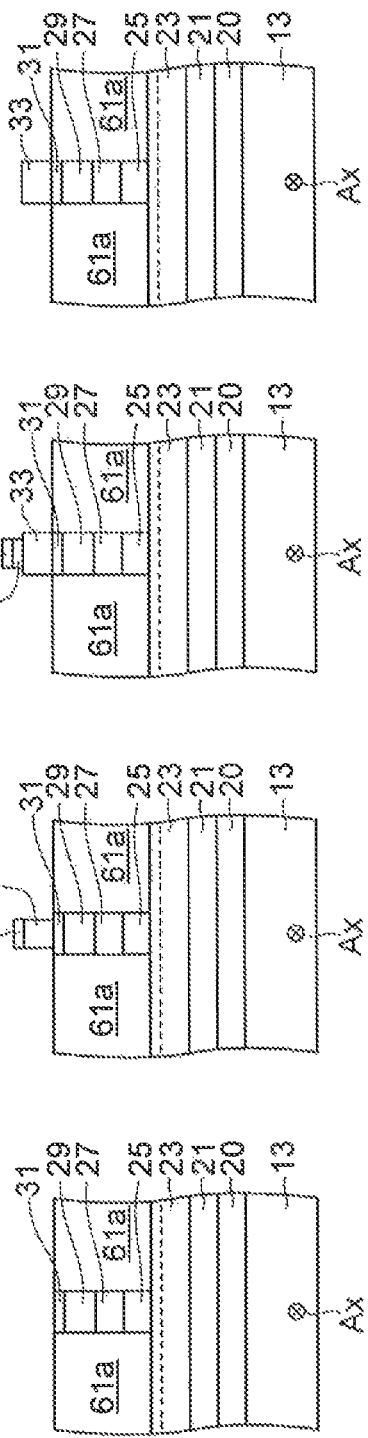

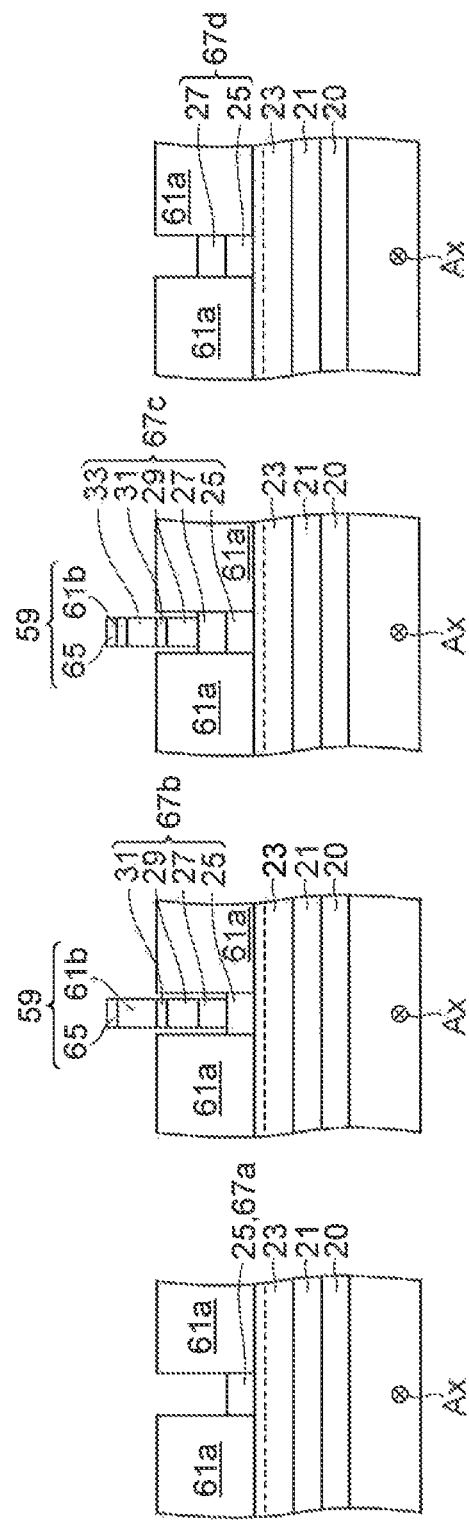

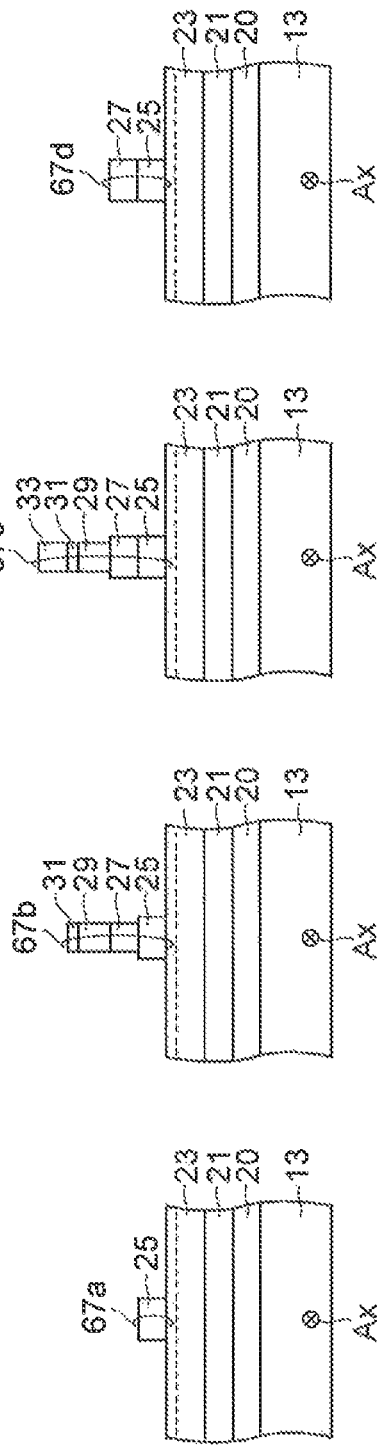

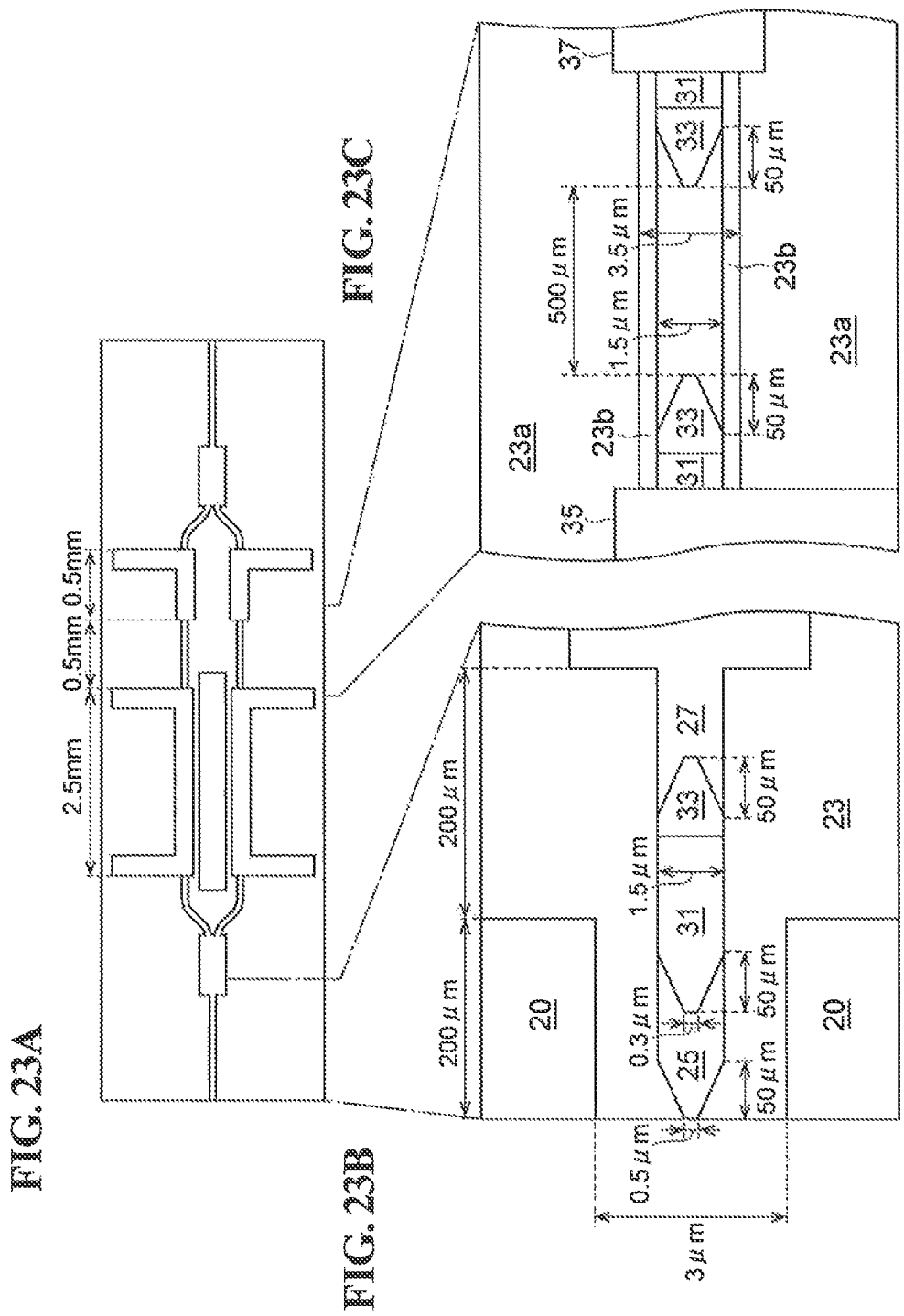

SEMICONDUCTOR OPTICAL DEVICE AND METHOD FOR MANUFACTURING SEMICONDUCTOR OPTICAL DEVICE

BACKGROUND OF THE INVENTION

1. Field of the Invention

The present invention relates to a semiconductor optical device and a method for manufacturing a semiconductor optical device.

2. Description of the Related Art

Patent Literature 1 (Japanese Unexamined Patent Application Publication No. 2011-039262) discloses a semiconductor optical modulator. Patent Literature 2 (U.S. Pat. No. 6,310,995) discloses a spot size converter (SSC).

Patent Literature 1 discloses a structure in which an electrical isolation groove is disposed in a semiconductor optical modulator. The isolation groove is formed by removing a portion of a cladding layer in the semiconductor optical modulator. At an end of the isolation groove, the cladding layer has a tapered portion. In the SSC disclosed in Patent Literature 2, two waveguides are stacked one on top of the other in a vertical direction. These waveguides have a two-stage mesa structure. The upper waveguide has a taper structure.

SUMMARY OP THE INVENTION

In the case of, for example, a semiconductor optical device including a semiconductor Mach-Zehnder (MZ) modulator, the optical waveguides include a stacked semiconductor layer structure. In optical waveguides including a stacked semiconductor layer structure, the transverse mode diameter for guided light is as small as, for example, 1 µm or less. When an optical waveguide having such a small transverse mode diameter is optically coupled to an external optical component such as an optical fiber or an external lens having a larger transverse mode diameter (for example, 2 to 8 µm), it is necessary to provide an optical coupling method with a low optical loss. An SSC is one of the devices used to decrease the optical loss in such optical couplings, and is integrated in the semiconductor optical device.

To increase transmission capacity, a wavelength multiplex transmission system is used in optical communication systems. In the wavelength multiplex transmission system, lights having a plurality of light wavelengths are used for transmission. Thus, optical waveguides and semiconductor optical devices are required to have desired loss characteristics in a wider range of wavelengths than in the transmission of single-wavelength light. That is, having low loss characteristics only in part of the transmission wavelength range is not sufficient in the wavelength multiplex transmission system. In the wavelength multiplex transmission system, loss characteristics of optical waveguides and semiconductor optical devices are needed to be adjusted in the wavelength range including the plurality of light wavelengths used for the transmission.

A method for manufacturing a semiconductor optical device according to an aspect of the present invention includes the steps of (a) preparing a substrate having a first region, a second region, a third region and a fourth region arranged in the direction of a waveguide axis; (b) growing a stacked semiconductor layer on the first region, the second region, the third region and the fourth region of the substrate, the stacked semiconductor layer including a lower core layer, an intermediate layer, an upper core layer, a first upper region including a non-doped semiconductor layer, a second upper region including a p-type semiconductor layer, and a cap layer; (c) forming a first mask on the stacked semiconductor layer; (d) forming an upper mesa by etching the stacked semiconductor layer using the first mask until the intermediate layer is exposed, the upper mesa including the upper core layer; (e) selectively etching the cap layer in the upper mesa on the first region and the second region; (f) after etching the cap layer, forming a second mask on the upper mesa in the second region and the third region of the substrate, the second mask having an opening on the upper mesa in the first region and the fourth region; (g) etching the upper mesa by a dry etching method using the second mask so as to form a first mesa portion, a second mesa portion, a third mesa portion and a fourth mesa portion on the first region, the second region, the third region and the fourth region, respectively; and (h) forming a lower mesa by etching the lower core layer, the lower mesa having a width larger than a width of the upper mesa, in the step of etching the upper mesa, the first mesa portion on the first region is formed by etching the first upper region and the second upper region. The second mesa portion on the second region is formed by etching the first upper region and the second upper region through the second mask. The third mesa portion on the third region is formed by etching the second upper region and the cap layer through the second mask, in addition, the fourth mesa portion on the fourth region is formed by etching the second upper region and the cap layer.

According to the method for manufacturing a semiconductor optical device, the upper mesa and the lower mesa having a width larger than a width of the upper mesa are formed on the first region and the second region of the substrate. Further, the first mesa portion, the second mesa portion, the third mesa portion and the fourth mesa portion are formed on the first region, the second region, the third region and the fourth region of the substrate, respectively. In this structure, the first mesa portion includes the upper core layer. Further, the second mesa portion includes the upper core layer, the first upper region and the second upper region. This configuration thus allows for the transition of light from one of the upper mesa and the lower mesa to the other.

Light transition occurring in the first mesa portion and the second mesa portion is accompanied by optical loss having wavelength dependency. The third mesa portion includes the upper core layer, the first upper region, the second upper region and the cap layer. On the other hand, the fourth mesa portion includes the upper core layer and the first upper region. In addition, the first upper region includes a non-doped semiconductor layer and the second upper region includes a p-type semiconductor layer doped with a p-type impurity. In this structure, the third mesa portion including both the first upper region and the second upper region exhibits a dependency of the optical absorption coefficient on wavelength which is different from that of the fourth mesa portion including the first upper region. The wavelength dependency of optical loss during the light transition in the semiconductor optical device may be adjusted by utilizing the different wavelength dependencies of the optical absorption coefficients between the third mesa portion and the fourth mesa portion.

In the method for manufacturing a semiconductor optical device according to the present invention, the cap layer may include a semiconductor material different from a semiconductor material of the semiconductor layer immediately below the cap layer. The step of selectively etching the cap layer in the upper mesa preferably includes the steps of after forming the upper mesa, forming an insulating film on a side surface and a top surface of the upper mesa in the first region, the second region, the third region and the fourth region, and on the substrate; forming an insulating film mask by etching the insulating film on the top surface of the upper mesa in the first region and the second region of the substrate by using anisotropic dry etching method without an etching mask, the insulating film mask having an opening on the upper mesa in the first region and the second region of the substrate; and selectively etching the cap layer in the upper mesa on the first region and the second region using the insulating film mask.

According to the method for manufacturing a semiconductor optical device, the insulating film is formed on a side surface and a top surface of the upper mesa in the first region, the second region, the third region and the fourth region, and on the substrate. The insulating film is anisotropically dry etched to form the insulating film mask, in this anisotropic dry etching, the insulating film on the top surface of the upper mesa in the first region and the second region is etched without an etching mask on the top surface of the upper mesa in the first region and the second region. On the other hand, the insulating film formed on the side surface of the upper mesa is hardly etched by the anisotropic dry etching. Therefore, the insulating film mask covers the side surface of the upper mesa and has an opening on the top surface of the upper mesa in the first region and the second region. As a result, the cap layer in the upper mesa on the first region and the second region of the substrate is selectively etched without etching the semiconductor layer constituting the second upper region by using the insulating film mask.

In the method for manufacturing a semiconductor optical device according to the present invention, the stacked semiconductor layer may further include a contact layer on the second upper region. The cap layer may be formed on the contact layer. The cap layer may be made of InP. The contact layer may be made of GaInAs or GaInAsP. In addition, in the step of etching the cap layer, the cap layer may be selectively etched by a wet etching method. The cap layer may be selectively etched by using a hydrochloric acid-containing aqueous solution as an etchant.

The method for manufacturing a semiconductor optical device according to the present invention, may further include the steps of, after etching the cap layer and before etching the upper mesa, forming a dummy buried region on a side surface and a top surface of the upper mesa and on the substrate, the dummy buried region including a material other than semiconductors; forming a resist mask on the dummy buried region, the resist mask having a pattern on the upper mesa in the second region and the third region, the resist mask having an opening on the upper mesa in the first region and fourth region; and etching the dummy buried region by using the resist mask so as to form the second mask on the second region and the third region of the substrate. The second mask may include an etched dummy buried region. The etched dummy buried region of the second mask on the second region may have a different thickness from a thickness of the etched dummy buried region of the second mask on the third region.

According to the method for manufacturing a semiconductor optical device, the upper mesa is buried in the dummy buried region with a substantially flat surface. The dummy buried region includes a material other than semiconductors. Thereafter, the resist mask is formed on the surface of the dummy buried region, the resist mask having a pattern on the upper mesa in the second region and the third region. The dummy buried region is etched by using the resist mask on the flat surface to form the second mask on the second region and the third region of the substrate. As a result, the mask for using in the fine processing of the spot size converter may be fabricated without being affected by the presence of elevation changes on the upper mesa as the base.

In the method for manufacturing a semiconductor optical device according to the present invention, the dummy buried region may be made of spin on glass (SOG).

In the method for manufacturing a semiconductor optical device according to the present invention, in the step of forming the second mask, the second mask on the upper mesa in the second region may have a thickness larger than the thickness of the second mask on the upper mesa in the third region.

According to the method for manufacturing a semiconductor optical device, the upper mesa is buried in the dummy buried region so that the dummy buried region has a substantially flat surface. When the second mask is formed on this surface, the second mask is allowed to have different thicknesses in accordance with the different shapes of the upper mesa as the base. Thus, the second mask may be concurrently formed on the upper mesa having different shapes of the bases in the second region and the third region of the substrate.

In the method for manufacturing a semiconductor optical device according to the present invention, the first upper region in the stacked semiconductor layer may have a thickness substantially equal to the thickness of the cap layer.

According to the method for manufacturing a semiconductor optical device, the amount of etching of the first upper region on the first region and the second region is controlled by adjusting the thickness of the first upper region and the thickness of the cap layer in the step of etching the upper mesa by a dry etching method using the second mask.

A semiconductor optical device according to another aspect of the present invention includes a substrate having a first region, a second region, a third region and a fourth region arranged in the direction of a waveguide axis; a lower mesa disposed on the first region, the second region, the third region and the fourth region of the substrate, the lower mesa including a lower core layer, the lower mesa having an end facet configured to be optically coupled to an external optical waveguide; a first mesa portion disposed on the first region, the first mesa portion including an upper core layer disposed on the lower core layer, the upper core layer being optically coupled to the lower core layer; a second mesa portion disposed on the second region, the second mesa portion including the upper core layer, a first upper region disposed on the upper core layer, and a second upper region disposed on the first upper region; a third mesa portion disposed on the third region, the third mesa portion including the upper core layer, the first upper region, the second upper region, and a cap layer disposed on the second upper region; and a fourth mesa portion disposed on the fourth region, the fourth mesa portion including the upper core layer and the first upper region. The first, second, third, and fourth mesa portion constitute an upper mesa having a width smaller than a width of the lower mesa. In addition, the first upper region in the second and third mesa portions includes anon-doped semiconductor layer. The second upper region in the second and third mesa portions includes a p-type semiconductor layer doped with a p-type impurity.

According to this semiconductor optical device, the lower mesa and the upper mesa having the width smaller than the width of the lower mesa are disposed on the first region and the second region of the substrate. Further, the first mesa portion, the second mesa portion, the third mesa portion and the fourth mesa portion are disposed on the first region, the second region, the third region and the fourth region of the substrate, respectively. In this structure, the first mesa portion includes the upper core layer. Further, the second mesa portion includes the upper core layer, the first upper region and the second upper region. This configuration thus allows for the transition of light from one of the upper mesa and the lower mesa to the other.

Light transition occurring in the first mesa portion and the second mesa portion is accompanied by optical loss having wavelength dependency. The third mesa portion includes the upper core layer, the first upper region, the second upper region and the cap layer. On the other hand, the fourth mesa portion includes the upper core layer and the first upper region. In addition, the first upper region includes a non-doped semiconductor layer and the second upper region includes a p-type semiconductor layer doped with a p-type impurity. In this structure, the third mesa portion including both the first upper region and the second upper region exhibits a dependency of the optical absorption coefficient on wavelength which is greater than that of the fourth mesa portion including the first upper region. The wavelength dependency of optical loss during the light transition in the semiconductor optical device may be adjusted by utilizing the different wavelength dependencies of the optical absorption coefficients between the third mesa portion and the fourth mesa portion.

In the semiconductor optical device according to the present invention, the lower mesa and the upper mesa may constitute a spot size converter disposed on the first region, the second region, the third region and the fourth region of the substrate.

In the semiconductor optical device according to the present invention, in the second mesa portion, the first upper region and the second upper region on the upper core layer may include a tapered portion having a width continuously decreasing in the direction of the waveguide axis, and a stripe portion having a constant width. Furthermore, in the third mesa portion, the second upper region and the cap layer on the first upper region may include a tapered portion having a width continuously decreasing in the direction of the waveguide axis, and a stripe portion having a constant width.

In the semiconductor optical device according to the present invention, the third mesa portion including the first upper region and the second upper region preferably has a dependency of an optical absorption coefficient on wavelength which is different from that of the fourth mesa portion including the first upper region.

The semiconductor optical device according to the present invention may further include a fifth mesa portion including the upper core layer, the first upper region and the second upper region; a sixth mesa portion including the upper core layer and the first upper region; and a seventh mesa portion including the upper core layer, the first upper region and the second upper region. The substrate may have a fifth region, a sixth region and a seventh region arranged in the direction of the waveguide axis. The fifth mesa portion, the sixth mesa portion, and the seventh mesa portion may be disposed on the fifth region, the sixth region, and the seventh region, respectively. In addition, the fifth mesa portion may be optically coupled to the seventh mesa portion through the sixth mesa portion.

In the semiconductor optical device according to the present invention, the lower mesa and the upper mesa that is disposed on the first region, the second region, the third region, and the fourth region of the substrate may constitute a spot size converter. In addition, the fifth mesa portion, the sixth mesa portion, and the seventh mesa portion may constitute an optical modulator optically coupled to the spot size converter.

The semiconductor optical device according to the present invention may further include a modulation electrode of the optical modulator disposed on the fifth mesa portion; and a phase-shifting electrode of the optical modulator disposed on the seventh mesa portion. The fifth mesa portion may include a contact layer disposed between the second upper region and the modulation electrode. In addition, the seventh mesa portion may include the contact layer disposed between the second upper region and the phase-shifting electrode.

According to this semiconductor optical device, the fifth mesa portion and the seventh mesa portion include the upper core layer, the first upper region, the second upper region and the contact layer. On the other hand, the sixth mesa portion includes the upper core layer and the first upper region. The fifth mesa portion is optically coupled to the seventh mesa portion through the sixth mesa portion. Consequently, the sixth mesa portion electrically isolates the fifth mesa portion and the seventh mesa portion from each other.

BRIEF DESCRIPTION OF THE DRAWINGS

FIGS. 8A to 8D are views illustrating major substrate regions in a semiconductor optical device manufacturing method.

FIGS. 9A to 9D are views illustrating major substrate regions in a semiconductor optical device manufacturing method.

FIGS. 10A to 10D are views illustrating major substrate regions in a semiconductor optical device manufacturing method.

FIGS. 12A to 12D are views illustrating major substrate regions in a semiconductor optical device manufacturing method.

FIGS. 15A to 15D are views illustrating major substrate regions in a semiconductor optical device manufacturing method.

FIGS. 16A to 16D are views illustrating major substrate regions in a semiconductor optical device manufacturing method.

FIGS. 19A to 19D are views illustrating major substrate regions in a semiconductor optical device manufacturing method.

FIGS. 21A and 213 are views illustrating major steps in a semiconductor optical device manufacturing method.

FIGS. 23A to 23C are views illustrating exemplary sizes of main features in a semiconductor optical device according to an embodiment of the invention.

DESCRIPTION OF THE PREFERRED EMBODIMENTS

Figure 1:
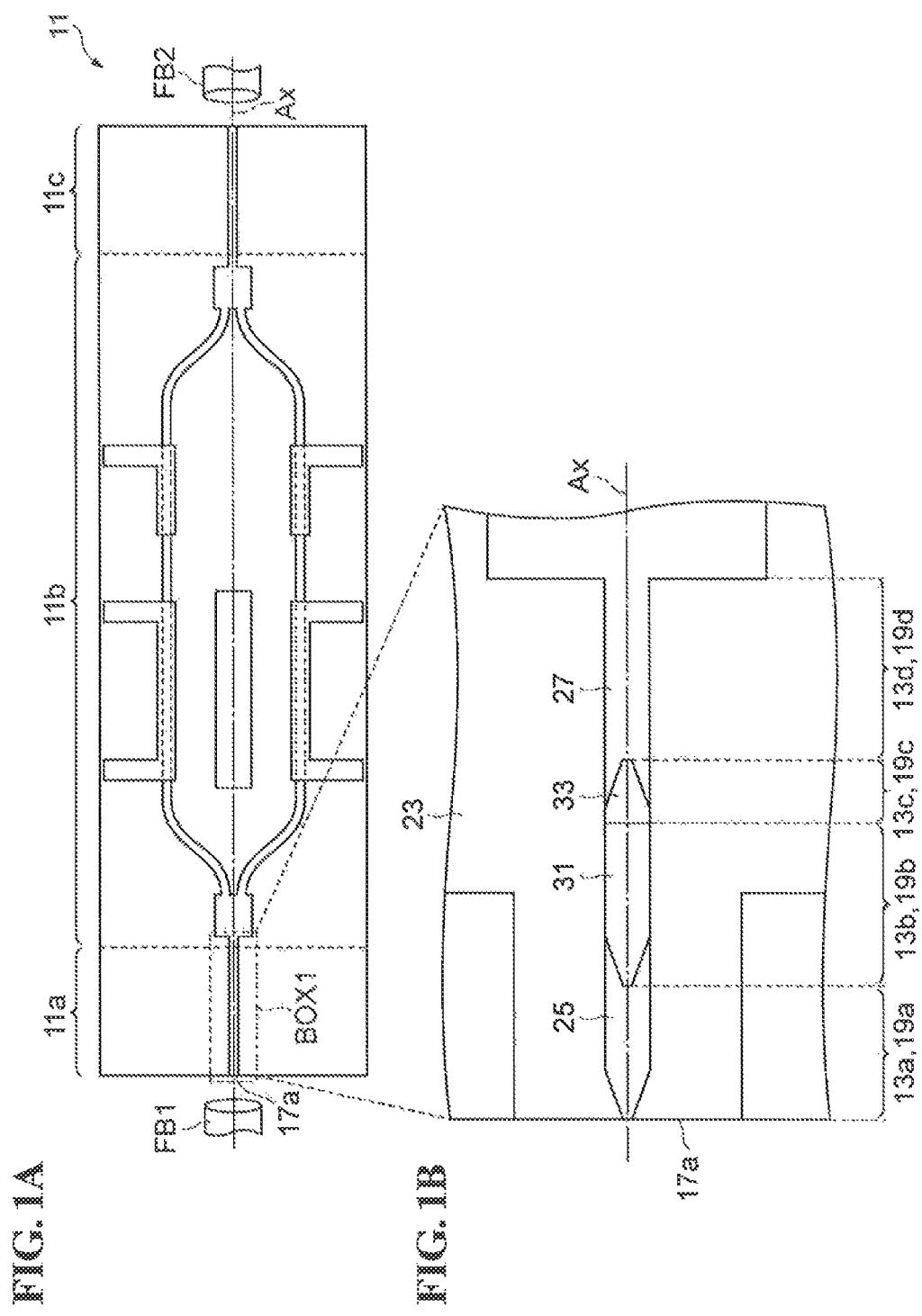
FIGS. 1A and 1B are views illustrating a semiconductor optical device according to an embodiment of the invention.

Embodiments of the semiconductor optical devices and the methods for manufacturing semiconductor optical devices according to the invention will be described with reference to the accompanying drawings. Where possible, the same reference numerals will be used for equivalent features.

FIGS. 1A and 1B are views illustrating a semiconductor optical device according to an embodiment of the invention. Referring to FIG. 1A, a semiconductor optical device 11 includes a spot size converter (SSC) 11a and an optical processing device 11b. The SSC 11a and the optical processing device 11b are optically coupled to each other. The semiconductor optical device 11 may further include a SSC 11c. In this case, the SSC 11c and the optical processing device 11b are optically coupled to each other. As shown in FIGS. 1A and 1B, the SSC 11a, the optical processing device 11b and the SSC 11c are arranged along an axis (waveguide axis) Ax. For example, the optical processing device 11b includes a MZ modulator. As will be understood from the following description, the semiconductor optical device 11 includes a substrate 13 and a stacked semiconductor layer 15 disposed on a principal surface of the substrate 13. The stacked semiconductor layer 15 includes various forms of mesa structures fabricated by processing.

Figure 2:
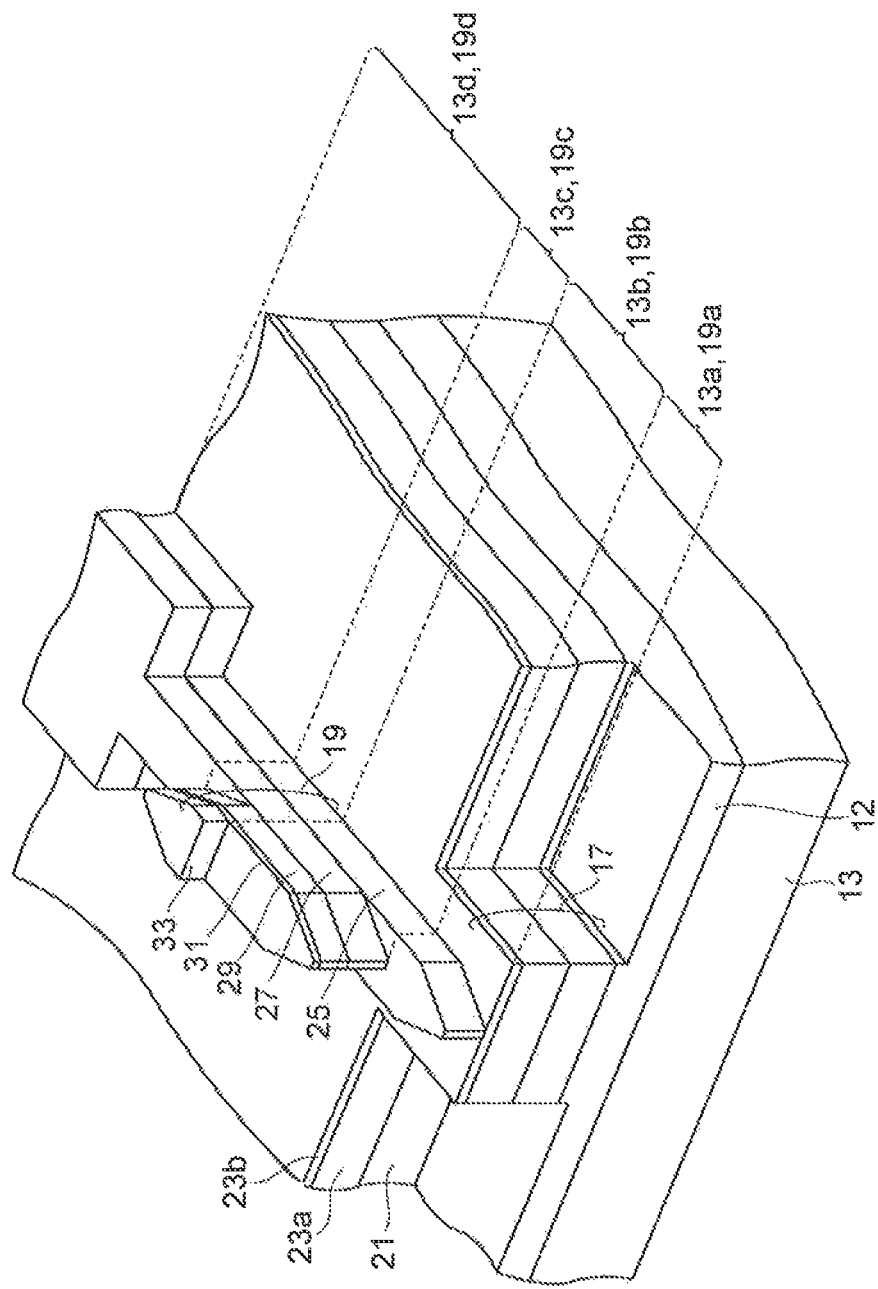
FIG. 2 is a perspective view of a device portion BOX 1 illustrated in FIG. 1B.

FIG. 1B shows an enlarged view of a device portion BOX 1 in the SSC 11a. FIG. 2 is a perspective view of the device portion BOX 1 illustrated in FIG. 1B. The SSC 11a includes a substrate 13, a lower mesa 17 and an upper mesa 19. The substrate 13 has a first region 13a, a second region 13b, a third region 13c and a fourth region 13d on which the SSC is formed. The first region 13a, the second region 13b, the third region 13c and the fourth region 13d of the substrate 13 are arranged in the direction of the waveguide axis Ax. The lower mesa 17 is disposed on the first region 13a, the second region 13b, the third region 13c and the fourth region 13d of the substrate 13. The lower mesa 17 has an end facet 17a which is to be optically coupled to an external optical waveguide FB1 or FB2. The external optical waveguides FB1 and FB2 include an optical fiber, for example. The upper mesa 19 includes a first mesa portion 19a, a second mesa portion 19b, a third mesa portion 19c and a fourth mesa portion 19d. The first mesa portion 19a, the second mesa portion 19b, the third mesa portion 19c and the fourth mesa portion 19d are disposed on the first region 13a, the second region 13b, the third region 13c and the fourth region 13d of the substrate 13, respectively. The lower mesa 17 includes a lower core layer 21. The first mesa portion 19a includes an upper core layer 25. The second mesa portion 19b includes the upper core layer 25, a first upper region 27, a second upper region 29 and a contact layer 31. The third mesa portion 19c includes the upper core layer 25, the first upper region 27, the second upper region 29, the contact layer 31 and a cap layer 33. The fourth mesa portion 19d includes the upper core layer 25 and the first upper region 27. On the third region 13c of the substrate 13, the lower core layer 21, an intermediate layer 23, the upper core layer 25, the first upper region 27, the second upper region 29, the contact layer 31 and the cap layer 33 are arranged sequentially in the direction of the normal to a principal surface 12 of the substrate 13. The first upper region 27 includes a non-doped semiconductor layer. The second upper region 29 includes a p-type semiconductor layer doped with a p-type impurity.

According to the semiconductor optical device 11, the upper mesa 19 and the lower mesa 17 having a width greater than the width of the upper mesa 19 are disposed on the first region 13a and the second region 13b of the substrate 13. Further, the first mesa portion 19a, the second mesa portion 19b, the third mesa portion 19c and the fourth mesa portion 19d are disposed on the first region 13a, the second region 13b, the third region 13c and the fourth region 13d of the substrate 13, respectively. In this structure, the first mesa portion 19a includes the upper core layer 25. Further, the second mesa portion 19b includes the upper core layer 25, the first upper region 27 and the second upper region 29. This configuration thus allows for the transition of light from one of the upper mesa 19 and the lower mesa 17 to the other.

Optical loss occurs due to light transition between the first mesa portion 19a and the second mesa portion 19b. Further, this optical loss associated with light transition has wavelength dependency. The first upper region 27 includes a non-doped semiconductor layer, and the second upper region 29 includes a p-type semiconductor layer doped with a p-type impurity such as zinc (Zn). The third mesa portion 19c includes the upper core layer 25, the first upper region 27, the second upper region 29, the contact layer 31 and the cap layer 33. The fourth mesa portion 19d includes the upper core layer 25 and the first upper region 27. In this structure, light is propagated to the third mesa portion 19c and the fourth mesa portion 19d in such a way that the third mesa portion 19c including both the first upper region 27 and the second upper region 29 exhibits a dependency of the optical absorption coefficient on wavelength. In addition, the dependency of the optical absorption coefficient on wavelength of the third mesa portion 19c is different from that of the fourth mesa portion 19d including the first upper region 27. The wavelength dependency of optical attenuation during the light transition in the semiconductor optical device 11 may be adjusted by utilizing the different wavelength dependencies of the optical absorption coefficients between the third mesa portion 19c and the fourth mesa portion 19d.

Figure 3A:
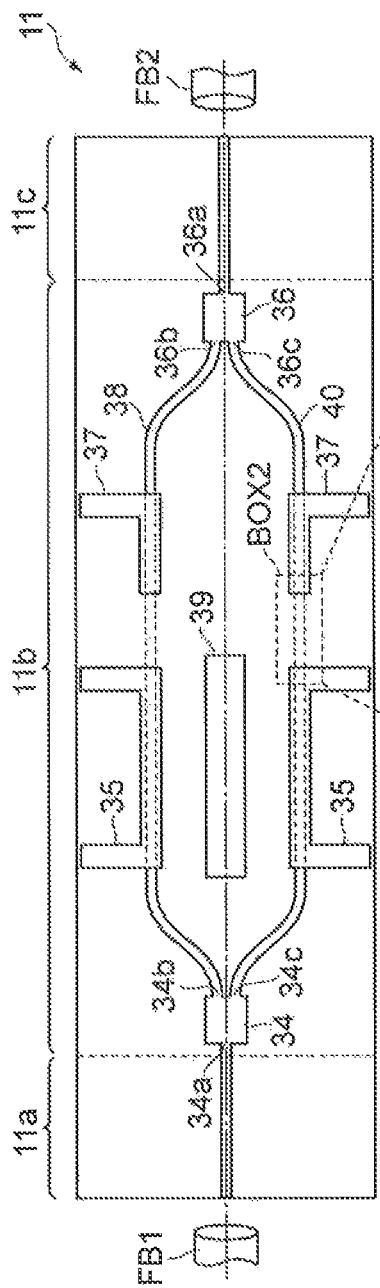
FIGS. 3A and 3B are views illustrating a semiconductor optical device according to an embodiment of the invention.
Figure 3B:
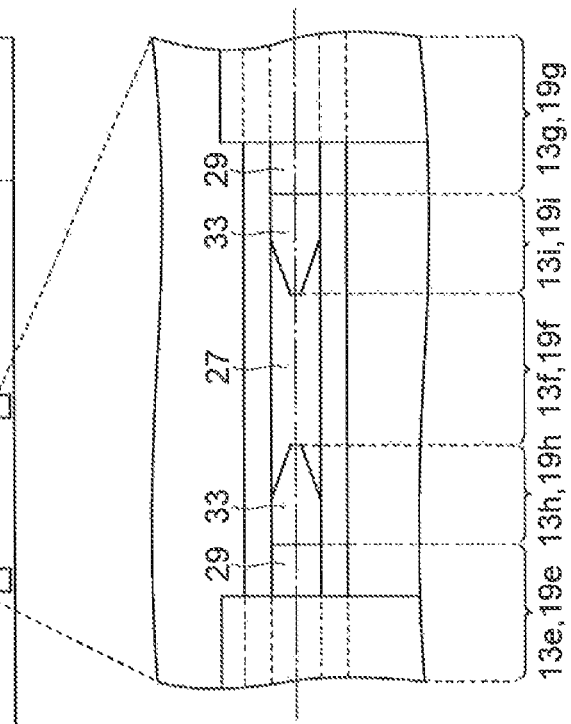
Figure 4A:
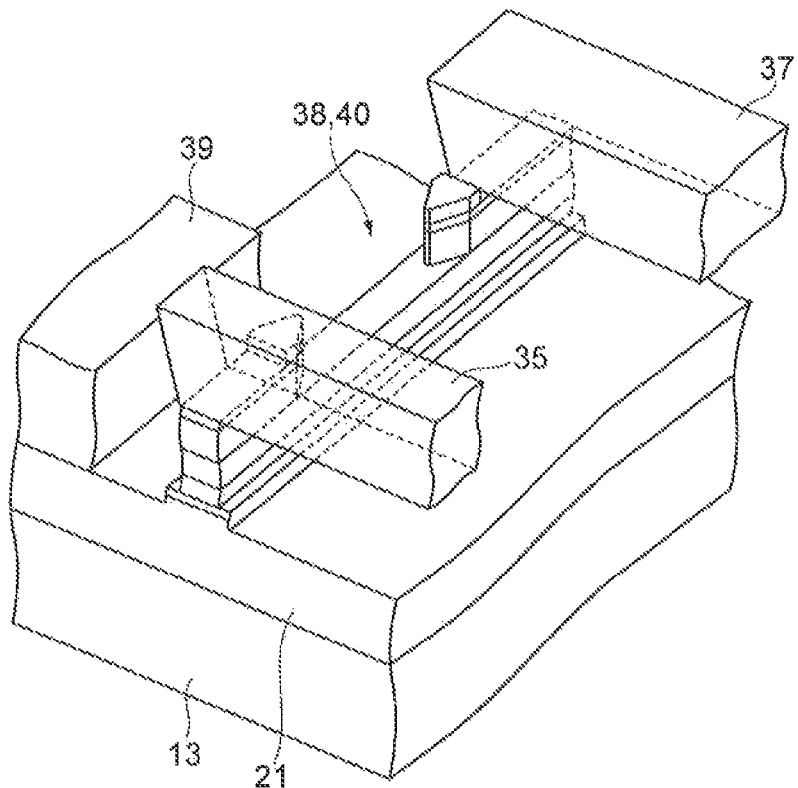
FIGS. 4A and 4B are perspective views of a device portion BOX 2 illustrated in FIG. 3B.
Figure 4B:
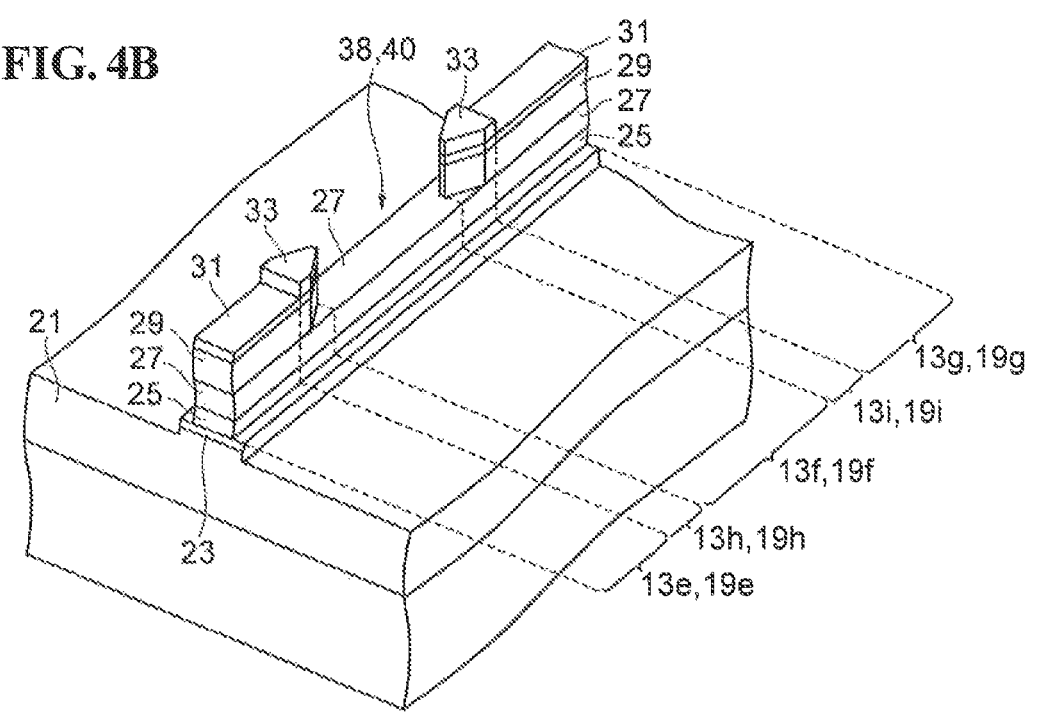

FIGS. 3A and 3B illustrate the semiconductor optical device according to the present embodiment. FIGS. 4A and 4B are perspective views of a device portion BOX 2 illustrated in FIG. 3B. Specifically, FIG. 4A illustrates electrodes and an optical waveguide of an optical modulator. To make visible the positional relationships of the electrodes and the optical waveguide of the optical modulator, resin fillers are not illustrated. FIG. 4B illustrates the optical waveguide of the optical modulator. To make visible the structure of the optical waveguide, the electrodes of the optical modulator and resin fillers are not illustrated.

Referring to FIGS. 3A and 3B and to FIGS. 4A and 4B, the SSCs 11a and 11c of the semiconductor optical device 11 are optically coupled to the MZ optical modulator of the optical processing device 11b. In this embodiment, the MZ optical modulator of the optical processing device 11b is optically coupled to the SSCs 11a and 11c through ports 34a and 36a of optical multiplexer/demultiplexers 34 and 36, respectively. For example, the optical multiplexer/demultiplexers 34 and 36 each include a 1×2 multi-mode interference (MMI) coupler. Of the remaining two ports of the optical multiplexer/demultiplexer 34, the port 34b is optically coupled to one of the remaining two ports of the optical multiplexer/demultiplexer 36, namely, the port 36b through a semiconductor optical waveguide A The other port of the remaining two ports of the optical multiplexer/demultiplexer 34, namely, the port 34c is optically coupled to the other of the remaining two ports of the optical multiplexer/demultiplexer 36, namely, the port 36c through a semiconductor optical waveguide 40.

The substrate 13 further includes a fifth region 13e, a sixth region 13f and a seventh region 13g. The upper mesa 19 includes a fifth mesa portion 19e, a sixth mesa portion 19f and a seventh mesa portion 19g. The fifth mesa portion 19e, the sixth mesa portion 19f and the seventh mesa portion 19g are disposed on the fifth region 13e, the sixth region 13f and the seventh region 13g of the substrate 13, respectively. The fifth mesa portion 19e includes the upper core layer 25, the first upper region 27, the second upper region 29 and the contact layer 31. The seventh mesa portion 19g includes the upper core layer 25, the first upper region 27, the second upper region 29 and the contact layer 31.

According to the semiconductor optical device 11, the optical modulator (11b) may be formed on the fifth region 13e, the sixth region 13f and the seventh region 13g of the substrate 13. This optical modulator is optically coupled to the SSCs 11a and 11c of the semiconductor optical device.

The semiconductor optical device 11 includes a modulation electrode 35, a phase-shifting electrode 37 and an electrode 39 in the optical modulator (11b). The electrode 35 is disposed on the fifth mesa portion 19e and is in contact with the uppermost layer (for example, the contact layer 31) of the fifth mesa portion 19e. The electrode 37 is disposed on the seventh mesa portion 19g and is in contact with the uppermost layer (for example, the contact layer 31) of the seventh mesa portion 19g. The sixth mesa portion 19f includes the upper core layer 25 and the first upper region 27. The fifth mesa portion 19e is optically coupled to the seventh mesa portion 19g through the sixth mesa portion 19f.

According to the semiconductor optical device 11, the fifth mesa portion 19e and the seventh mesa portion 192 include the upper core layer 25, the first upper region 27, the second upper region 29 and the contact layer 31. On the other hand, the sixth mesa portion 19f includes the upper core layer 25 and the first upper region 27. The fifth mesa portion 19e is optically coupled to the seventh mesa portion 19g through the sixth mesa portion 19f as described above. Consequently, the sixth mesa portion 19f electrically separates the fifth mesa portion 19e and the seventh mesa portion 19g from each other. The electrode 39 is disposed on the lower core layer 21 and is in contact with the surface of the lower core layer 21 having a high impurity concentration.

In the semiconductor optical device 11, the substrate 13 further includes an eighth region 13h and a ninth region 13i. The upper mesa 19 further includes an eighth mesa portion 19h and a ninth mesa portion 19i. The eighth mesa portion 19h and the ninth mesa portion 19i are disposed on the eighth region 13h and the ninth region 13i of the substrate 13, respectively. The eighth mesa portion 19h includes the upper core layer 25, the first upper region 27, the second upper region 29, the contact layer 31 and the cap layer 33. The ninth mesa portion 19i includes the upper core layer 25, the first upper region 27, the second upper region 29, the contact layer 31 and the cap layer 33. The fifth mesa portion 19e, the eighth mesa portion 19h, the sixth mesa portion 19f, the ninth mesa portion 19i and the seventh mesa portion 19g are sequentially arranged on the fifth region 13e, the eighth region 13h, the sixth region 13f, the ninth region 13i and the seventh region 13g of the substrate 13, respectively.

As mentioned above, optical loss occurs due to light transition between the first mesa portion 19a and the second mesa portion 19b. This optical loss associated with light transition has wavelength dependency. The eighth mesa portion 19h includes the upper core layer 25, the first upper region 27, the second upper region 29, the contact layer 31 and the cap layer 33. The ninth mesa portion 19i includes the upper core layer 25, the first upper region 27, the second upper region 29, the contact layer 31 and the cap layer 33. On the other hand, the sixth mesa portion 19f includes the upper core layer 25 and the first upper region 27. In addition, in the eighth mesa portion 19h, the ninth mesa portion 19i and the sixth mesa portion 19f, the first upper region 27 includes a non-doped semiconductor layer and the second upper region 29 includes a Hype semiconductor layer.

In this structure, light is propagated to the eighth mesa portion 19h, the sixth mesa portion 19f and the ninth mesa portion 19i in such a way that the eighth mesa portion 19h and the ninth mesa portion 19i including both the first upper region 27 and the second upper region 29 exhibit a dependency of the optical absorption coefficient on wavelength. In addition, the dependency of the optical absorption coefficient on wavelength of the eighth mesa portion 19h and the ninth mesa portion 19i is greater than that of the sixth mesa portion 19f including the first upper region 27. The wavelength dependency of optical attenuation during the light transition in the semiconductor optical device 11 is adjusted by utilizing the different wavelength dependencies of the optical absorption coefficients between the eighth mesa portion 19h and the ninth mesa portion 19i, and the sixth mesa portion 19f.

Next, a method for manufacturing the semiconductor optical device 11 will be described. Here, an example will be described in which an array (a one-dimensional or two-dimensional array) of semiconductor optical devices 11 is fabricated on a semiconductor wafer, with reference to sectional views and plan views illustrating major steps. For easy understanding, the reference numerals used in the description of the structure illustrated in FIGS. 1A to 4B will be continuously used in the following description.

Figure 5A:
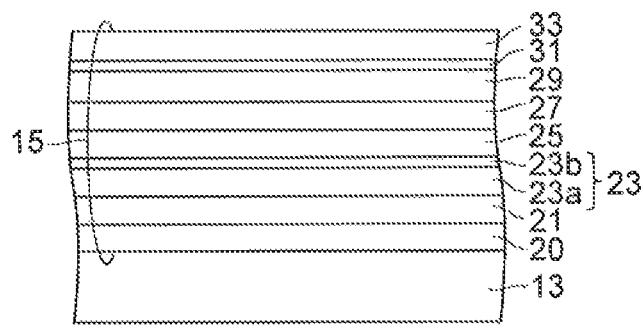
FIGS. 5A to 5C are views illustrating major steps in a semiconductor optical device manufacturing method.

As illustrated in FIG. 5A, a substrate 13 is provided and a stacked semiconductor layer 15 is grown on the substrate 13 by, for example, a metal-organic vapor phase epitaxy (MOVPE) method. For example, the substrate 13 is an InP substrate. The InP substrate may include semi-insulating InP. The stacked semiconductor layer 15 includes a lower core layer 21, an intermediate layer 23, an upper core layer 25, a first upper region 27, a second upper region 29, a contact layer 31 and a cap layer 33. An example of the stacked semiconductor layer 15 includes the following:

a lower cladding layer 20: non-doped InP, thickness 0.5 µm;

a lower core layer 21: Si-doped GaInAsP (band gap wavelength: 1.1 µm), thickness 1.0 µm;

an intermediate cladding layer 23a (an intermediate layer 23): Si-doped InP, thickness 0.5 µm;

an intermediate etching stopper layer 23b (the intermediate layer 23): Si-doped GaInAsP (band gap wavelength: 1.0 μm), thickness 0.1 μm;

an upper core layer 25: a non-doped multi quantum well (MQW) structure with a photoluminescence (PL) peak wavelength of 1.4 μm, thickness 0.5 μm;

a first upper region 27: a non-doped InP upper cladding layer, thickness 0.5 μm;

a second upper region 29: a p-type InP upper cladding layer, thickness 1.5 μm, Zn concentration $1 \times 10^{18}$ cm$^{-3}$;

a contact layer 31: a p-type GaInAs or GaInAsP contact layer, thickness 0.2 μm, Zn concentration $1 \times 10^{18}$ cm$^{-3}$; and a cap layer 33: a p-type InP cap layer, thickness 0.5 μm, Zn concentrations $1 \times 10^{18}$ cm$^{-3}$.

In growing the stacked semiconductor layer 15, the first upper region 27 has a thickness substantially equal to the thickness of the cap layer 33, for example. According to this manufacturing method, the amount of etching of the first upper region 27 may be adjusted by controlling the thickness of the first upper region 27 and the thickness of the cap layer 33.

Figure 5B:
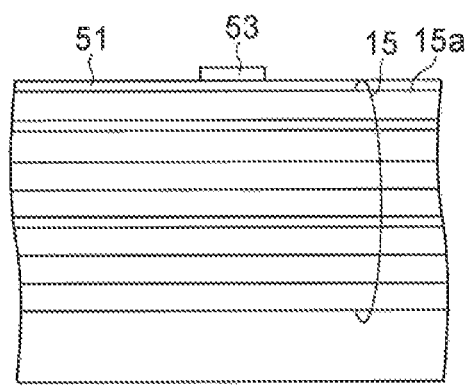

After the stacked semiconductor layer 15 is grown on the substrate 13, as illustrated in FIG. 5B, an insulating film 51 is formed on the entirety of a top surface 15a of the stacked semiconductor layer 15. For example, the insulating film Si is a silicon-containing inorganic insulating film such as a SiN film, a SiO$_2$ film, or SiON film.

Figure 5C:
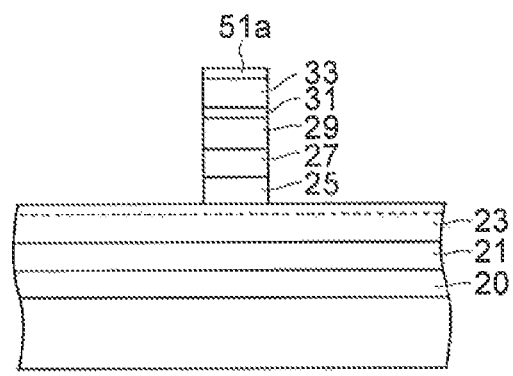

Next, on the insulating film 51, a resist mask 53 is formed which has a pattern for the formation of a mesa. The insulating film 51 is dry etched through the resist mask 53. As a result of this dry etching, a first mask 51a is formed as illustrated in FIG. 5C. The first mask 51a is an insulating film mask formed of the insulating film 51. The resist mask 53 is removed as required.

Figure 6:
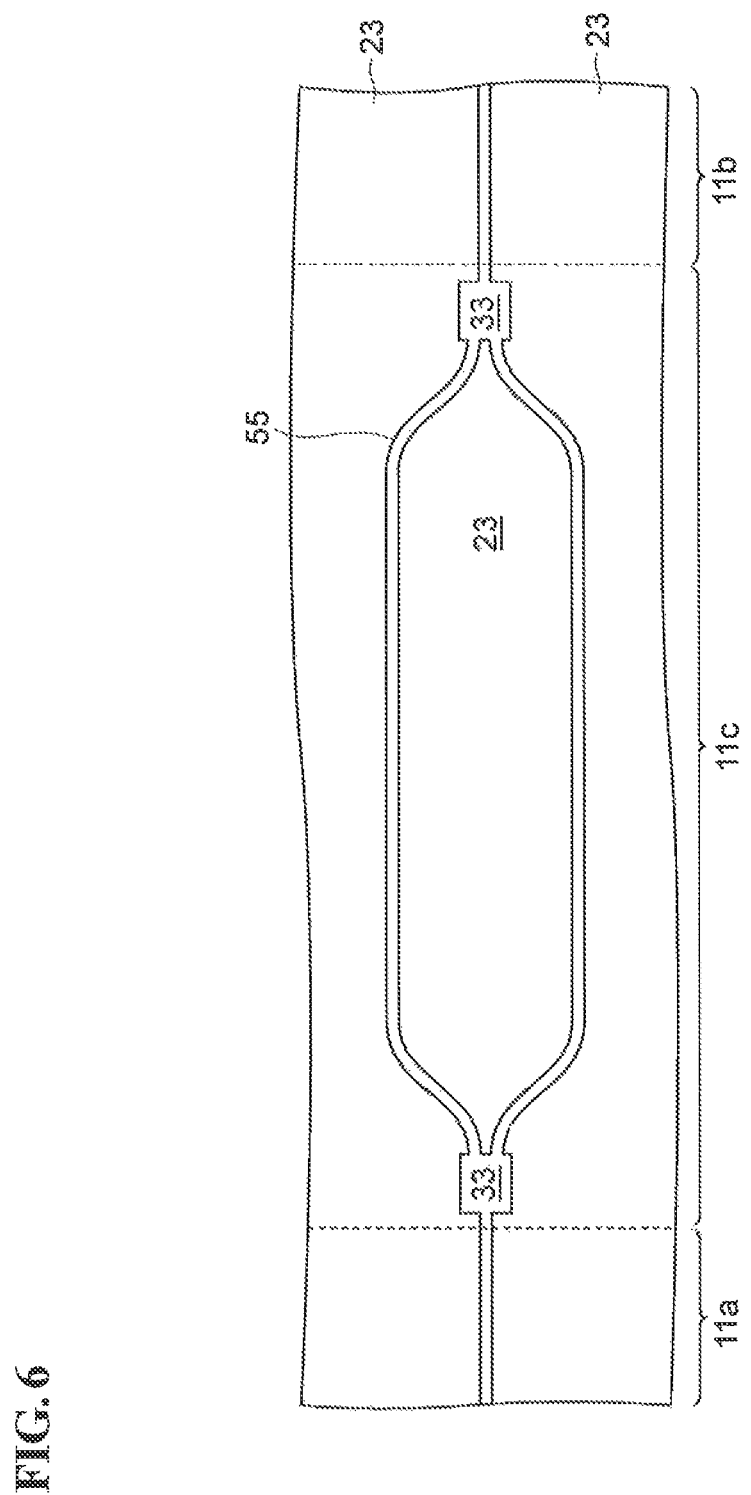
FIG. 6 is a view illustrating a pattern of an upper mesa in a semiconductor optical device manufacturing method.

As illustrated in FIG. 5C, the stacked semiconductor layer 15 is etched by using the first mask 51a disposed on the stacked semiconductor layer 15 as an etching mask. This etching produces an upper mesa 55. During this etching, the semiconductor layers of the cap layer 33 to the upper core layer 25 are removed until the intermediate layer 23 (intermediate etching stopper layer 23b) is exposed in conformity with the mask pattern, thereby forming the upper mesa 55. Thus, the upper mesa 55 includes the upper core layer 25, the first upper region 27, the second upper region 29, the contact layer 31 and the cap layer 33. FIG. 6 is a plan view illustrating the shape of the upper mesa 55.

After the formation of the upper mesa 55, the cap layer 33 in a first region 13a and a second region 13b of the substrate 13 is removed from the upper mesa 55. Exemplary procedures in the step of removing the cap layer 33 from the stacked semiconductor layer 15 will be described below.

Figures 7A, 7B, 7C, 7D:
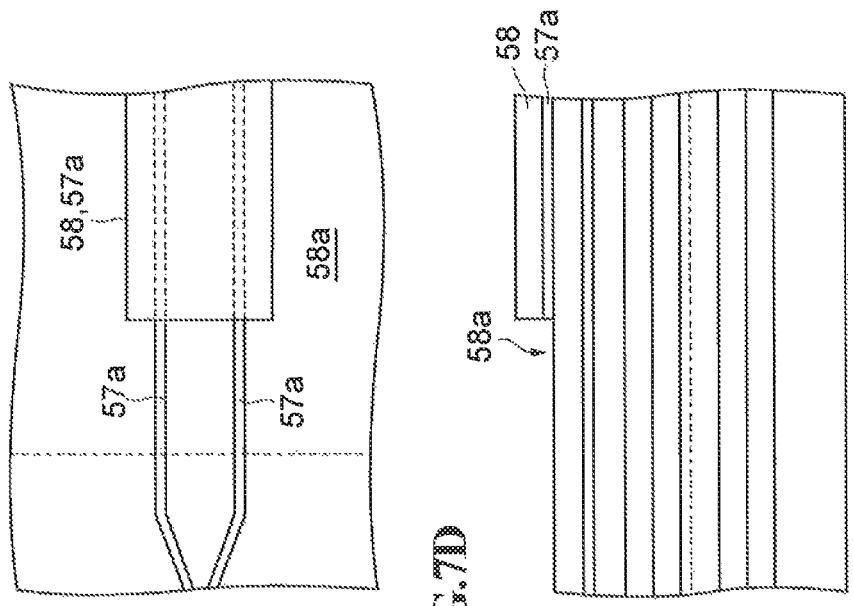
FIGS. 7A to 7D are views illustrating major steps in a semiconductor optical device manufacturing method.

After the upper mesa 55 is formed, as illustrated in FIGS. 7A and 7B, an insulating film 57 is formed on the entire surface of the substrate 13. For example, the insulating film 57 is a silicon-containing inorganic insulating film made of SiN, SiO$_2$ or SiON, for example. FIG. 7A is a view illustrating a region in which a SSC 11a or 11c will be fabricated. FIG. 7B shows across section taken along the line I-I in FIG. 7A.

After the insulating film 57 is formed, as illustrated in FIGS. 7C and 7D, a resist mask 58 is formed on the insulating film 57. The resist mask 58 has an opening 58a on the upper mesa 55 in the first region 13a and the second region 13b of the substrate 13.

FIG. 8A illustrates a cross section of the upper mesa 55 and the nearby stacked semiconductor layer structure on the first region 13a, in a direction intersecting with the axis Ax. FIG. 8B illustrates a cross section of the upper mesa 55 and the nearby stacked semiconductor layer structure on the second region 13b, in a direction intersecting with the axis Ax. In the first region 13a and the second region 13b, a top surface 55a and side surfaces 55b of the upper mesa 55 as well as nearby semiconductor surfaces 55c are covered with the insulating film 57. FIG. 8C illustrates a cross section of the upper mesa 55 and the nearby stacked semiconductor layer structure on the third region 13c, in a direction intersecting with the axis Ax. FIG. 8D illustrates a cross section of the upper mesa 55 and the nearby stacked semiconductor layer structure on the fourth region 13d, in a direction intersecting with the axis Ax, in the third region 13c and the fourth region 13d, the top surface 55a and the side surfaces 55b of the upper mesa 55 as well as the semiconductor surfaces 55c in the vicinity of the upper mesa 55 are covered with the insulating film 57. Further, the resist mark 58 covers the insulating film 57 on the top surface 55a and the side surfaces 55b of the upper mesa 55 as well as on the semiconductor surfaces 55c in the vicinity of the upper mesa 55.

Next, the insulating film 57 is anisotropically dry etched through the resist mask 58. As illustrated in FIGS. 7C and 7D, this etching produces an insulating film mask 57a. The insulating film 57 on the top surface 55a in the first region 13a and the second region 13b is etched by using the anisotropic dry etching method without an etching mask. In this anisotropic dry etching, the insulating film 57 on the side surface 55b in the first region 13a and the second region 13b is not etched though the side surface 55b in the first region 13a and the second region 13b is not covered with the resist mask 58. The insulating film 57 on the top surface 55a and the side surface 55b in the third region 13c and the fourth region 13c is not etched because the insulating film 57 on the top surface 55a and the side surfaces 55b of the upper mesa 55 is covered with the resist mark 58. In the anisotropic dry etching process, a reactive ion etching (RIE) apparatus such as an ICP-RIE (inductive coupled plasma reactive ion etching) apparatus is used, for example. The ICP-RIE apparatus has an ICP output power supply and a bias output power supply. The anisotropic dry etching may be performed by adjusting the self-bias voltage by controlling a high-frequency electric power supplied from the bias output power supply. The etching gas used for RIE may be, for example, carbon tetrafluoride (CF$_4$) gas.

FIG. 9A illustrates a cross section of the upper mesa 55 and the nearby stacked semiconductor layer structure on the first region 13a, in a direction intersecting with the axis Ax. FIG. 9B illustrates a cross section of the upper mesa 55 and the nearby stacked semiconductor layer structure on the second region 13b, in a direction intersecting with the axis Ax. In the first region 13a and the second region 13b, the side surfaces 55b of the upper mesa 55 are covered with the insulating film (57). The top surface 55a of the upper mesa 55 and the nearby semiconductor surfaces 55c are not covered with the insulating film (57). FIG. 9C illustrates a cross section of the upper mesa 55 and the nearby stacked semiconductor layer structure on the third region 13c, in a direction intersecting with the axis Ax. FIG. 9D illustrates a cross section of the upper mesa 55 and the nearby stacked semiconductor layer structure on the fourth region 13d, in a direction intersecting with the axis Ax. In the third region 13c and the fourth region 13d, the top surface 55a and the side surfaces 55b of the upper mesa 55 as well as the semiconductor surfaces 55c in the vicinity of the upper mesa 55 are covered with the insulating film (57). The portion of the insulating film (57) covered with the resist mask 58 has been protected from etching, and the insulating film (57a) still covers the top surface 55a and the side surfaces 55b of the upper mesa 55 as well as the semiconductor surfaces 55c in the vicinity of the upper mesa 55. Through the procedures described above, the insulating film mask 57a is formed.

Next, the cap layer 33 in the first region 13a and the second region 13b of the substrate 13 is removed from the upper mesa 55 by using the above-formed insulating film mask 57a. In this embodiment, the cap layer 33 is selectively etched away from the upper mesa 55 by using a wet etching method while using an etchant which has a high etching rate with respect to the cap layer 33 and has a very low etching rate with respect to the semiconductor surfaces 55c and to the layer under the cap layer 33. The cap layer 33 includes InP, and the intermediate cladding layer 23a (the intermediate layer 23) includes Si-doped InP, for example. Thus, the InP cap layer 33 is wet etched while avoiding the wet etching of the InP intermediate cladding layer 23a. Therefore, the intermediate etching stopper layer 23b including GaInAsP is disposed between the cap layer 33 and the intermediate cladding layer 23a. In the embodiment, the intermediate etching stopper layer 23b is formed between the upper core layer 25 and the intermediate cladding layer 23a, Here, the etchant used in the etching of InP is, for example, a hydrochloric acid-containing aqueous solution. This etchant exhibits a low etching rate with respect to GaInAsP that constitutes the intermediate etching stopper layer 23b. Thus, the GaInAsP is not substantially etched with this etchant. This etching is terminated when the surface of the contact layer 31 is exposed on the upper mesa 55 in the first region 13a and the second region 13b.

FIG. 10A illustrates a cross section of the upper mesa 55 and the nearby stacked semiconductor layer structure on the first region 13a, in a direction intersecting with the axis Ax. FIG. 10B illustrates a cross section of the upper mesa 55 and the nearby stacked semiconductor layer structure on the second region 13b, in a direction intersecting with the axis Ax. In the first region 13a and the second region 13b, the side surfaces 55b of the upper mesa 55 are covered with the insulating film (57). Thus, in this embodiment, the etching of the cap layer 33 proceeds starting from the top surface 55a of the upper mesa 55 and stops at the surface of the contact layer 31. When a material constituting the semiconductor surface 55c is changed to a material different from the semiconductor material forming the cap layer 33 with the progress of the etching, the semiconductor surface 55c is no longer substantially etched.

FIG. 10C illustrates a cross section of the upper mesa 55 and the nearby stacked semiconductor layer structure on the third region 13c, in a direction intersecting with the axis Ax. FIG. 10D illustrates a cross section of the upper mesa 55 and the nearby stacked semiconductor layer structure on the fourth region 13d, in a direction intersecting with the axis Ax. In the third region 13c and the fourth region 13d, the top surface 55a and the side surfaces 55b of the upper mesa 55 as well as the semiconductor surfaces 55c in the vicinity of the upper mesa 55 are covered with the insulating film (57). The top surface 55a and the side surfaces 55b of the upper mesa 55 as well as the nearby semiconductor surfaces 55c are not etched because of being covered with the insulating film (57). When a material constituting the semiconductor surface 55c is changed to a material different from the semiconductor material forming the cap layer 33 with the progress of the etching, the semiconductor surface 55c is no longer substantially etched.

According to this manufacturing method, the insulating film (57) is formed on the first region 13a, the second region 13b, the third region 13c and the fourth region 13d of the substrate 13, and thereafter the resist mask is formed which has an opening on the upper mesa 55 in the first region 13a and the second region 13b of the substrate 13. Through the resist mask, the insulating film (57) is anisotropically dry etched to form the insulating film mask 57a. This insulating film mask 57a has an opening on the top surface 55a of the upper mesa 55 in the first region 13a and the second region 13b of the substrate 13. Further, the insulating film mask 57a covers the side surfaces 55b of the upper mesa 55. As a result, the cap layer 33 in the upper mesa 55 on the first region 13a and the second region 13b of the substrate 13 is selectively etched without etching the semiconductor layer immediately below the cap layer 33, namely, the second upper region 29 or the semiconductor layer on top thereof (for example, the p-type contact layer 31).

Figure 11A:
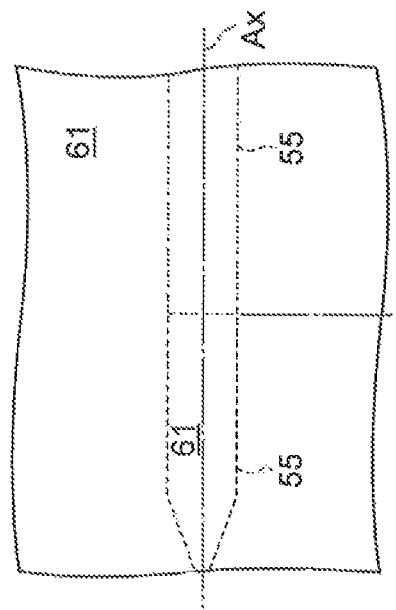
FIGS. 11A to 11D are views illustrating major steps in a semiconductor optical device manufacturing method.
Figure 11B:
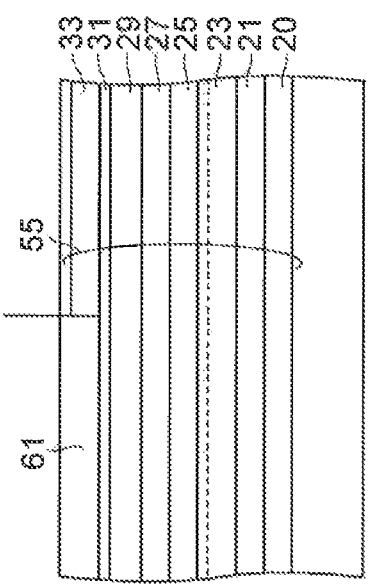

Immediately after the removal of the cap layer 33, the insulating film mask 57a still remains. FIG. 11A is a view illustrating a region in which the SSC 11 in or 11c will be fabricated. FIG. 11B shows a cross section taken along the axis Ax in FIG. 11A. As illustrated in FIGS. 11A and 11B, after the removal of the insulating film mask 57a, the upper mesa 55 is formed.

After the removal of the insulating film mask 57a, a second mask (reference numeral "59" in FIGS. 15B and 15C) is formed which has a pattern on the upper mesa 55 on the second region 13b and the third region 13c of the substrate 13. Through the second mask, the upper mesa 55 is thy etched. This etching produces a first mesa portion, a second mesa portion, a third mesa portion and a fourth mesa portion on the first region 13a, the second region 13b, the third region 13c and the fourth region 13d of the substrate 13, respectively.

Figure 11C:
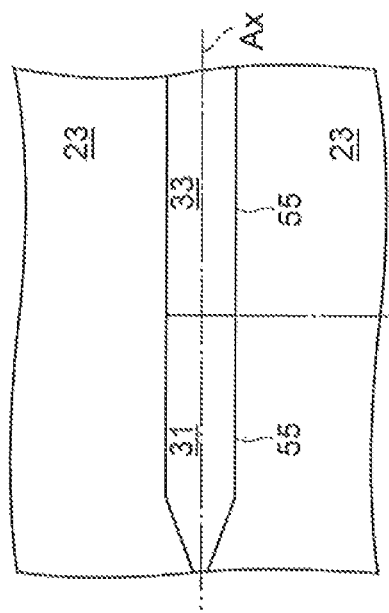
Figure 11D:
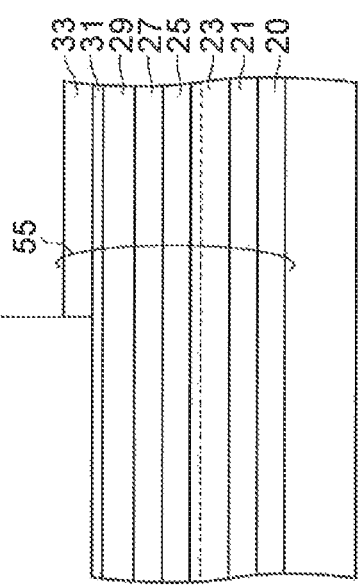

Exemplary procedures in the step of forming the second mask (reference numeral "59" in FIGS. 15B and 15C) will be described below. First, as illustrated in FIGS. 11C and 11D, a dummy buried region 61 is formed on the substrate 13 so as to bury the upper mesa 55. The dummy buried region 61 includes a material other than semiconductors. The dummy buried region 61 buries the upper mesa 55 and covers the top surface and the side surfaces of the upper mesa 55. Here, FIG. 11C is a view illustrating a region in which the SSC 11a or 11c will be fabricated. FIG. 11D shows a cross section taken along the axis Ax in FIG. 11C.

FIG. 12A illustrates a cross section of the upper mesa 55 and the nearby stacked semiconductor layer structure on the first region 13a, in a direction intersecting with the axis Ax. FIG. 12B illustrates a cross section of the upper mesa 55 and the nearby stacked semiconductor layer structure on the second region 13b, in a direction intersecting with the axis Ax. In the first region 13a and the second region 13b, the top surface and the side surfaces of the upper mesa 55 are covered with the dummy buried region 61. In the first region 13a and the second region 13b, the upper mesa 55 does not include the cap layer 33. Thus, the dummy buried region 61 covers the contact layer 31 defining the top surface 55a of the upper mesa 55. For example, the dummy buried region 61 includes spin on glass (SOG) containing $SiO_2$.

FIG. 12C illustrates a cross section of the upper mesa 55 and the nearby stacked semiconductor layer structure on the third region 13c, in a direction intersecting with the axis Ax. FIG. 12D illustrates a cross section of the upper mesa 55 and the nearby stacked semiconductor layer structure on the fourth region 13d, in a direction intersecting with the axis Ax. In the third region 13c and the fourth region 13d, the top surface and the side surfaces of the upper mesa 55 are covered with the dummy buried region 61. In the third region 13c and the fourth region 13d, the upper mesa 55 includes the cap layer 33. Thus, the dummy buried region 61 covers the cap layer 33 defining the top surface 55a of the upper mesa 55.

As illustrated in FIGS. 12A to 12D, the surface of the dummy buried region 61 is substantially flat in spite of having a protrusion of the upper mesa 55 underneath thereof in the first region 13a, the second region 13b, the third region 13c, and the fourth region 13d. The thickness DMT1 of the dummy buried region 61 from the top surface 55a of the upper mesa 55 on the first region 13a and the second region 13b is different from the thickness DMT2 of the dummy buried region 61 from the top surface 55a of the upper mesa 55 on the third region 13c and the fourth region 13d. In this embodiment, the thickness DMT1 is larger than the thickness DMT2.

Figure 13A:
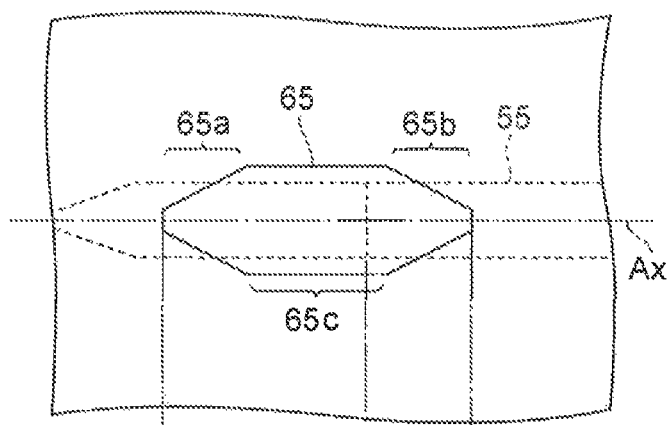
FIGS. 13A and 13B are views illustrating major steps in a semiconductor optical device manufacturing method.
Figure 13B:
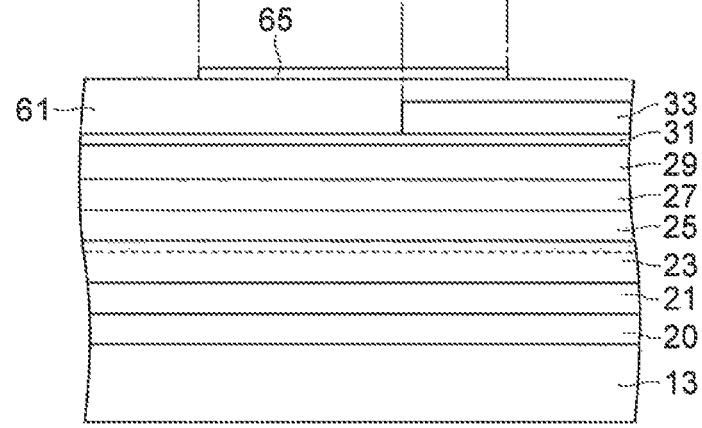

After the dummy buried region 61 is formed, a resist mask 65 is formed on the dummy buried region 61 as illustrated in FIGS. 13A and 13B. Because the surface of the dummy buried region 61 is flat, the thickness of the resist mask 65 is substantially uniform.

The mask 65 has a pattern on the second region 13b and the third region 13c of the substrate 13. The resist mask 65 has a stripe shape extending in the direction of the axis Ax. End portions 65a and 65b of the resist mask 65 define tapered portions with a decreasing width in the direction of the axis Ax. The taper tip width is approximately 0.5 µm. The formation of such a fine mask is feasible by virtue of the dummy buried region 61. A stripe portion 65c of the resist mask 65 is disposed between the end portions 65a and 65b. The width of the stripe portion 65c is larger than the width of the upper mesa 55.

After the resist mask 65 is formed, the semiconductor layers are etched through the resist mask 65. In accordance with the combinations of the presence or absence of the pattern of the resist mask 65 and the presence or absence of the cap layer 33, four structures may be fabricated by this etching.

Figure 14A:
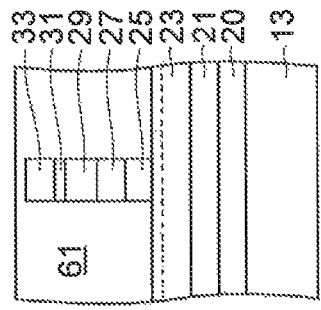
FIGS. 14A to 14D are views illustrating major substrate regions in a semiconductor optical device manufacturing method.

FIG. 14A illustrates across section of the upper mesa 55 and the nearby stacked semiconductor layer structure on the first region 13a, in a direction intersecting with the axis Ax. In the first region 13a, the upper mesa 55 does not include the cap layer 33. There is no pattern of the resist mask 65 on the dummy buried region 61 on the upper mesa 55. The resist mask 65 has an opening in the first region 13a.

Figures 14B, 14C:
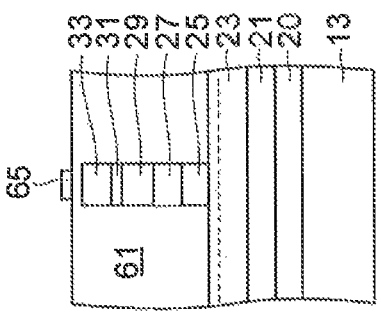

FIG. 14B illustrates Across section of the upper mesa 55 and the nearby stacked semiconductor layer structure on the second region 13b, in a direction intersecting with the axis Ax. In the second region 13b, the upper mesa 55 does not include the cap layer 33. The pattern of the resist mask 65 is disposed on the dummy buried region 61 on the upper mesa 55. The resist mask 65 has the stripe-shaped pattern in the second region 13b.

FIG. 14C illustrates a cross section of the upper mesa 55 and the nearby stacked semiconductor layer structure on the third region 13c, in a direction intersecting with the axis Ax. In the third region 13c, the upper mesa 55 includes the cap layer 33. The pattern of the resist mask 65 is disposed on the dummy buried region 61 on the upper mesa 55. The resist mask 65 has the stripe-shaped pattern in the third region 13c.

Figure 14D:
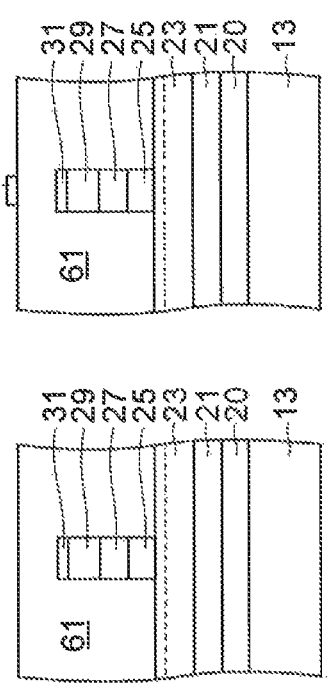

FIG. 14D illustrates a cross section of the upper mesa 55 and the nearby stacked semiconductor layer structure on the fourth region 13d, in a direction intersecting with the axis Ax. In the fourth region 13d, the upper mesa 55 includes the cap layer 33. There is no pattern of the resist mask 65 on the dummy buried region 61 on the upper mesa 55. The resist mask 65 has an opening in the fourth region 13d.

While, in this embodiment, the fabrication process of the first region 13a, the second region 13b, the third region 13c and the fourth region 13d in which the SSC is formed is illustrated, the procedures for fabricating some of these regions 13a to 13d may be similarly applied to the fabrication of waveguides that constitute a MZ modulator.

The dummy buried region 61 is etched by using the resist mask 65 as an etching mask, thereby transferring the pattern of the resist mask 65 to the dummy buried region 61. This etching produces the second mask 59. During this etching, the dummy buried region 61 is etched in accordance with the pattern of the resist mask 65 whilst the upper mesa 55 is not substantially etched.

FIG. 15A illustrates a cross section of the upper mesa 55 and the nearby stacked semiconductor layer structure on the first region 13a, in a direction intersecting with the axis Ax. In the first region 13a, the upper mesa 55 does not include the cap layer 33. There is no pattern of the resist mask 65 on the dummy buried region 61 on the upper mesa 55. The resist mask 65 has an opening in the first region 13a. Thus, the dummy buried region 61 in the first region 13a is etched substantially uniformly. The etching of the dummy buried region 61 is performed approximately to such a depth that the top surface of the upper mesa 55 (surface of the contact layer 31) is exposed. As a result, an etched dummy buried region 61a is formed on both sides of the upper mesa 55.

FIG. 15B illustrates a cross section of the upper mesa 55 and the nearby stacked semiconductor layer structure on the second region 13b, in a direction intersecting with the axis Ax. In the second region 13b, the upper mesa 55 does not include the cap layer 33. The pattern of the resist mask 65 is disposed on the dummy buried region 61 on the upper mesa 55. The resist mask 65 has the stripe-shaped pattern in the second region 13b. Thus, the dummy buried region 61 in the second region 13b is etched substantially uniformly. Simultaneously, the dummy buried region 61 may be processed to the shape of the pattern of the resist mask 65. The etching of the dummy buried region 61 is performed approximately to such a depth that the top surface (surface of the contact layer 3) of the upper mesa 55 is exposed. On the top surface (the contact layer 31) of the upper mesa 55, a dummy buried region 61b remains in accordance with the shape of the pattern of the resist mask 65. The etched dummy buried region 61a is formed on both sides of the upper mesa 55. The second mask 59 includes the etched dummy buried region 61b and the resist mask 65.

FIG. 15C illustrates a cross section of the upper mesa 55 and the nearby stacked semiconductor layer structure on the third region 13c, in a direction intersecting with the axis Ax. In the third region 13c, the upper mesa 55 includes the cap layer 33. The pattern of the resist mask 65 is disposed on the dummy buried region 61 on the upper mesa 55. The resist mask 65 has the stripe-shaped pattern in the third region 13c. Thus, the dummy buried region 61 in the third region 13c is etched substantially uniformly. Simultaneously, the dummy buried region 61 may be processed to the shape of the pattern of the resist mask 65. The etching of the dummy buried region 61 is performed approximately to such a depth that the etching reaches to the surface of the contact layer 31 of the upper mesa 55. On the top surface (the cap layer 33) of the upper mesa 55, the dummy buried region 61b remains in accordance with the shape of the pattern of the resist mask 65. The cap layer 33 in the upper mesa 55 is not substantially etched by selecting the etchant used in this etching process that has a low etching rate for the material constituting the cap layer 33. The etched dummy buried region 61a is formed on both sides of the upper mesa 55. The second mask 59 includes the etched dummy buried region 61b and the resist mask 65.

FIG. 15D illustrates a cross section of the upper mesa 55 and the nearby stacked semiconductor layer structure on the fourth region 13d, in a direction intersecting with the axis Ax.

In the fourth region 13d, the upper mesa 55 includes the cap layer 33. There is no pattern of the resist mask 65 on the dummy buried region 61 on the upper mesa 55. The resist mask 65 has an opening in the fourth region 13d. Thus, the dummy buried region 61 in the fourth region Lid is etched substantially uniformly. The etching of the dummy buried region 61 is performed approximately to such a depth that the etching reaches to the surface of the contact layer 31 of the upper mesa 55, similarly to the etching in the third region 13c. The cap layer 33 in the upper mesa 55 is not substantially etched due to the etching selectivity of the etchant used in this etching process. As a result of the etching, the etched dummy buried region 61a is formed on both sides of the upper mesa 55.

An example of the methods for form ilia the second mask 59 has been described above. Through the above steps, the dummy buried region 61 is etched with use of the resist mask 65 to form the second mask 59. The second mask 59 has the pattern on the second region 13b and the third region 13c of the substrate 13. The second mask 59 includes the etched dummy buried region 61b and the resist mask 65. The etched dummy buried region 61b of the second mask 59 on the second region 13b has the thickness of DMT1 that is different from the thickness (DMT2) of the etched dummy buried region 61b of the second mask 59 on the third region 13c. In the embodiment, the thickness of the etched dummy buried region 61b of the second mask 59 on the second region 13b is larger than the thickness of the etched dummy buried region 61b of the second mask 59 on the third region 13c. In addition, the second mask 59 includes an opening on the first region 13a and the fourth region 13d of the substrate 13. Therefore, the surfaces of the upper mesa 55 on the first region 13a and the fourth region 13d are not covered with the second mask 59.

In the dry etching of the upper mesa 55, the thickness of the second mask 59 on the upper mesa 55 on the second region 13b of the substrate 13 is larger than the thickness of the second mask 59 on the upper mesa 55 on the third region 13c of the substrate 13. According to the manufacturing method, the upper mesa 55 is buried in the dummy buried region 61 by forming the dummy buried region 61 having a substantially flat surface. When the second mask 59 is formed on this surface, the second mask 59 is allowed to have different thicknesses in accordance with the different shapes of the upper mesa 55 as the base. Thus, the mask (second mask 59) is concurrently formed on the upper mesa 55 having different shapes of the bases in the second region 13b and the third region 13c of the substrate 13.

The upper mesa 55 (the semiconductor layers) is etched with use of the second mask 59 having the pattern on the upper mesa 55 on the second region 13b and the third region 13c of the substrate 13. By this etching, the pattern of the second mask 59 is transferred to the upper mesa 55. For example, this etching in this embodiment involves an etchant containing chlorine gas. This dry etching produces a first mesa portion 67a, a second mesa portion 67b, a third mesa portion 67c and a fourth mesa portion 67d on the first region 13a, the second region 13b, the third region 13c and the fourth region 13d of the substrate 13, respectively. During this etching, the upper mesa 55 is etched in accordance with the pattern of the second mask 59. However, the dummy buried region 61a is not substantially etched.

FIG. 16A illustrates a cross section of the upper mesa 55 and the nearby stacked semiconductor layer structure on the first region 13a, in a direction intersecting with the axis Ax. In the first region 13a, the upper mesa 55 does not include the cap layer 33. There is no pattern of the second mask 59 on the upper mesa 55. The second mask 59 has an opening in the first region 13a. Thus, while the dummy buried region 61a in the first region 13a is not etched, the upper mesa 55 is etched from its top surface to, for example, the upper core layer 25. That is, the upper mesa 55 is etched approximately to such a depth that the upper core layer 25 is exposed. As a result, a groove is defined by the etched dummy buried region 61a.

FIG. 16B illustrates a cross section of the upper mesa 55 and the nearby stacked semiconductor layer structure on the second region 13b, in a direction intersecting with the axis Ax. In the second region 13b, the upper mesa 55 does not include the cap layer 33. The pattern of the second mask 59 is disposed on the upper mesa 55. The second mask 59 has the stripe-shaped pattern in the second region 13b. As mentioned above, the dummy buried region 61a in the second region 13b is not etched. As a result, the upper mesa 55 may be processed to the shape of the pattern of the second mask 59. The upper mesa 55 is etched approximately to such a depth that the top surface of, for example, the upper core layer 25 is exposed. On the upper core layer 25, a portion of the upper mesa 55 (the semiconductor layers 27, 29 and 31) that forms a tapered portion remains with the shape corresponding to the pattern of the second mask 59. As a result of this etching, a groove is defined by the dummy buried region 61a. In this groove, the portion of the upper mesa 55 (the semiconductor layers 27, 29 and 31) extends so as to form a tapered portion and is connected to the stripe portion having a constant width (the width of the upper mesa 55). In the second region 13b, the tapered portion on the upper core layer 25 in the upper mesa 55 may reduce a reflection of light guiding through the upper core layer 25 at the end of the optical waveguide.

FIG. 16C illustrates a cross section of the upper mesa 55 and the nearby stacked semiconductor layer structure on the third region 13c, in a direction intersecting with the axis Ax. In the third region 13c, the upper mesa 55 includes the cap layer 33. The pattern of the second mask 59 is disposed on the upper mesa 55. The second mask 59 has the stripe-shaped pattern in the third region 13c. As mentioned above, the dummy buried region 61a in the third region 13c is not etched. As a result, the upper mesa 55 may be processed to the shape of the pattern of the second mask 59. In the first region 13a, and the second region 13b, the etching is performed approximately to such a depth that the top surface of the upper core layer 25 is exposed. In the third region 13c in which the upper mesa 55 includes the cap layer 33, on the other hand, the upper mesa 55 is etched approximately to such a depth that the top surface of, for example, the first upper region 27 is exposed. Because the upper mesa 55 includes the cap layer 33, a portion of the upper mesa 55 (the semiconductor layers 29, 31 and 33) that forms a tapered portion remains on the first upper region 27, with the shape corresponding to the pattern of the second mask 59. As a result of this etching, a groove is defined by the dummy buried region 61a. In this groove, the portion of the upper mesa 55 (the semiconductor layers 29, 31 and 33) extends so as to form a tapered portion and is connected to the stripe portion having a constant width (the width of the upper mesa 55). In the third region 13c, the tapered portion on the first upper region 27 in the upper mesa 55 may reduce a reflection of light guiding through the upper core layer 25 at the end of the optical waveguide.

FIG. 16D illustrates a cross section of the upper mesa 55 and the nearby stacked semiconductor layer structure on the fourth region 13d, in a direction intersecting with the axis Ax, in the fourth region 13d, the upper mesa 55 includes the cap layer 33. There is no pattern of the second mask 59 on the upper mesa 55. The second mask 59 has an opening in the fourth region 13d. Thus, while the dummy buried region 61a in the fourth region 13d is not etched, the upper mesa 55 is etched from its top surface to a depth in the semiconductor layers, for example, the first upper region 27. That is, the upper mesa 55 is etched approximately to such a depth that the first upper region 27 on the upper core layer 25 is exposed. As a result, a groove is defined by the etched dummy buried region 61a.

According to the manufacturing method, the upper mesa 55 is buried in the dummy buried region 61 with a substantially flat surface which includes a material other than semiconductors. Thereafter, the resist mask 65 may be formed on the surface of the dummy buried region 61, the resist mask 65 having a pattern on the second region 13b and the third region 13c of the substrate 13. The dummy buried region 61 is etched by using the resist mask 65 on the flat surface to form the second mask 59 on the second region 13b and the third region 13c of the substrate 13. The second mask 59 for use in the fine processing of SSC 11a or 11c may be thus fabricated without being affected by the presence of elevation changes on the upper mesa 55 as the base.

The upper mesa 55 composed of the semiconductor layers is etched by dry etching with use of the second mask 59 having a pattern on the upper mesa 55 on the second region 13b and the third region 13c of the substrate 13. This etching produces an upper mesa 67. The etched upper mesa 67 includes a first mesa portion 67a, a second mesa portion 67b, a third mesa portion 67c and a fourth mesa portion 67d on the first region 13a, the second region 13b, the third region 13c and the fourth region 13d of the substrate 13, respectively.

The first mesa portion 67a includes the upper core layer 25. The upper core layer 25 defines the top surface of the upper mesa 67. The second mesa portion 67b includes the upper core layer 25, the first upper region 27, the second upper region 29 and the contact layer 31. The second mesa portion 67b includes a tapered portion which has a width decreasing in the direction of the axis Ax. In the second mesa portion 67b, the tapered portion is defined as a result of the etching of the first upper region 27, the second upper region 29 and the contact layer 31. In this embodiment, the taper tip width is approximately 0.5 µm. The formation of such a fine structure is feasible by virtue of the dummy buried region 61. The third mesa portion 67c includes the upper core layer 25, the first upper region 27, the second upper region 29, the contact layer 31 and the cap layer 33. The third mesa portion 67c includes a tapered portion which has a width decreasing in the direction of the axis Ax. In the third mesa portion 67c, the tapered portion is defined as a result of the etching of the second upper region 29, the contact layer 31 and the cap layer 33. In this embodiment, the taper tip width is approximately 0.5 µm. The formation of such a fine tapered structure is feasible by virtue of the dummy buried region 61. The fourth mesa portion 67d includes the upper core layer 25 and the first upper region 27. In the first mesa portion 67a, the second mesa portion 67b, the third mesa portion 67c and the fourth mesa portion 67d, the first upper region 27 includes a non-doped semiconductor layer in which any p-type or n-type impurities are not intentionally doped. The second upper region 29 includes a p-.type semiconductor layer doped with a p-type impurity.

The etching time for the semiconductor layers is determined in accordance with the thickness of the layers to be etched which are included in the stacked semiconductor layer 15 from the cap layer 33 to the upper core layer 25. For example, the etching time is approximately the duration of time which allows the removal by etching of the total of the thickness of the cap layer 33 including InP layer and the thickness of the second upper region 29 including InP layer, and the contact layer 31 including GaInAs or GaInAsP layer.

When the thickness of the cap layer 33 is equal to the thickness of the first upper region 27, the upper core layer 25 in the first region 13a and the second region 13b may be exposed.

Figure 17A:
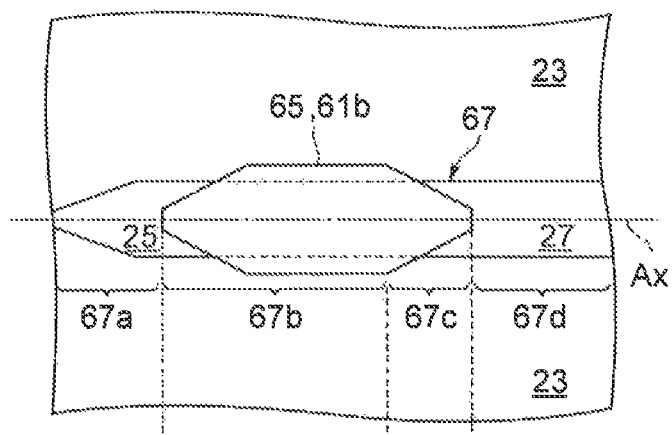
FIGS. 17A and 17B are views illustrating major steps in a semiconductor optical device manufacturing method.
Figure 17B:
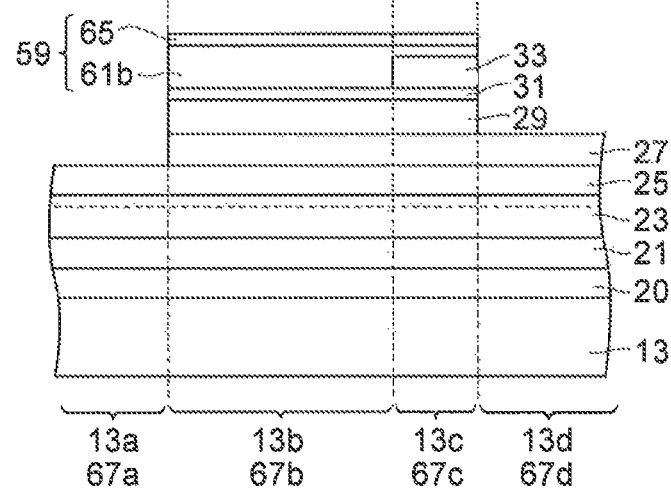

Referring to FIG. 17A, the first mesa portion 67a on the first region 13a, the second mesa portion 67b on the second region 13b, the third mesa portion 67c on the third region 13c and the fourth mesa portion 67d on the fourth region 13d are shown. The first mesa portion 67a, the second mesa portion 67b, the third mesa portion 67c, and the fourth mesa portion 67d are formed by the dry etching of the upper mesa 55 through the second mask 59. FIG. 17B shows a cross section taken along the axis Ax in FIG. 17A. The second mask 59 remains which has been used to avoid the etching of the second mesa portion 67b on the second region 13b and the third mesa portion 67c on the third region 13c. From the comparison of the heights of the first mesa portion 67a on the first region 13a and the fourth mesa portion 67d on the fourth region 13d, the fourth mesa portion 67d on the fourth region 13d is higher than the first mesa portion 67a on the first region 13a. Prior to the etching, there used to be the cap layer 33 on the fourth region 13d. Thus, the difference between the heights of the first mesa portion 67a and the fourth mesa portion 67d is ascribed to the thickness of the cap layer 33. Accordingly, the first mesa portion 67a and the fourth mesa portion 67d are formed with different heights in accordance with the thickness of the cap layer 33.

Figure 18A:
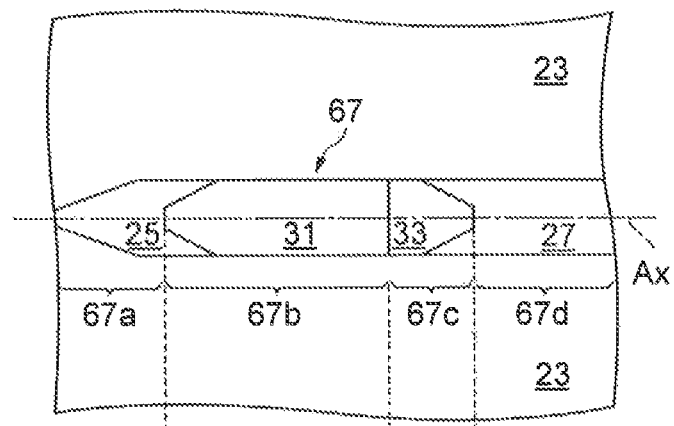
FIGS. 18A and 18B are views illustrating major steps in a semiconductor optical device manufacturing method.
Figure 18B:
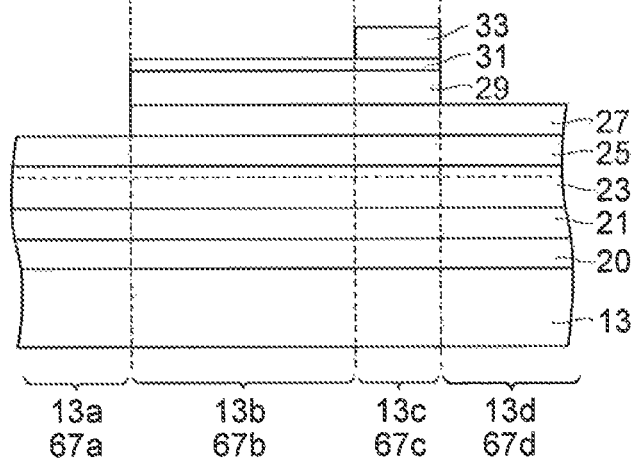

As shown in FIG. 18A, after the removal of the second mask 59, the first mesa portion 67a on the first region 13a, the second mesa portion 67b on the second region 13b, the third mesa portion 67c on the third region 13c and the fourth mesa portion 67d on the fourth region 13d are formed. FIG. 18B shows a cross section taken along the axis Ax in FIG. 18A. In this embodiment, after the removal of the resist mask 65 of the second mask 59, the etched dummy buried region 61b of the second mask 59 is removed with, for example, hydrofluoric acid. When the etched dummy buried region 61b of the second mask 59 is removed, the etched dummy buried region 61a is also removed, simultaneously. As a result of the removal of the second mask 59, the upper mesa 67 is formed on the substrate 13. When the upper mesa 55 is dry etched, the entirety of the second upper region 29 is etched. Simultaneously, a portion or the entirety of the first upper region 27 is also etched. This etching produces the first mesa portion 67a on the first region 13a. When the upper mesa 55 is dry etched, thither, the entirety of the contact layer 31 is etched. Simultaneously, a portion or the entirety of the second upper region 29 is also etched. This etching produces the fourth mesa portion 67d on the fourth region 13d. According to the manufacturing method, the upper mesa 55 may be processed so as to form a plurality of mesa structures (67) with different heights in accordance with the combinations of whether the cap layer 33 has been removed or not, namely, the presence or absence of the cap layer 33, and the presence or absence of the etching pattern of the second mask 59. Preferably, the thickness of the cap layer 33 is substantially equal to the thickness of the first upper region 27.

FIGS. 19A to 19D are views illustrating the upper mesa 67. FIG. 19A illustrates a cross section of the upper mesa 67a and the nearby stacked semiconductor layer structure on the first region 13a, in a direction intersecting with the axis Ax. In the first region 13a, the upper mesa 67a includes the upper core layer 25. The upper core layer 25 includes a tapered portion having a width continuously decreasing in the direction of the axis Ax.

FIG. 19B illustrates a cross section of the upper mesa 67b and the nearby stacked semiconductor layer structure on the second region 13b, in a direction intersecting with the axis Ax. In the second region 13b, the upper mesa 67b includes the upper core layer 25, the first upper region 27, the second upper region 29 and the contact layer 31. The first upper region 27, the second upper region 29 and the contact layer 31 on the upper core layer 25 include a tapered portion having a width continuously decreasing in the direction of the axis Ax, and a stripe portion having a constant width.

FIG. 19C illustrates a cross section of the upper mesa 67c and the nearby stacked semiconductor layer structure on the third region 13c, in a direction intersecting with the axis Ax. In the third region 13c, the upper core layer 25 and the first upper region 27 have a constant width. The upper mesa 67c includes the upper core layer 25, the first upper region 27, the second upper region 29, the contact layer 31 and the cap layer 33. The second upper region 29, the contact layer 31 and the cap layer 33 on the first upper region 27 include a tapered portion having a width continuously decreasing in the direction of the axis Ax and a stripe portion having a constant width.

FIG. 19D illustrates a cross section of the upper mesa 67d and the nearby stacked semiconductor layer structure on the fourth region 13d, in a direction intersecting with the axis Ax. In the fourth region 13d, the upper mesa 67d includes the upper core layer 25 and the first upper region 27. The upper core layer 25 and the first upper region 27 include a stripe portion having a constant width.

After the formation of the first mesa portion 67a, the second mesa portion 67b, the third mesa portion 67c and the fourth mesa portion 67d, a third mask is formed to cover the upper mesa 67, the third mask having a pattern with a width larger than the upper mesa 67. The lower core layer 21 is etched through the third mask, thereby forming a lower mesa 69 that constitutes the SSC. For example, chlorine (Cl$_2$) may be used as the etchant in this etching. In this embodiment, the intermediate layer 23 and the lower core layer 21 are etched in order to form the lower mesa 69. In this etching, at least a portion of the lower cladding layer 20 may be etched. The lower mesa 69 may include the intermediate layer 23, the lower core layer 21 and the lower cladding layer 20.

Figure 20A:
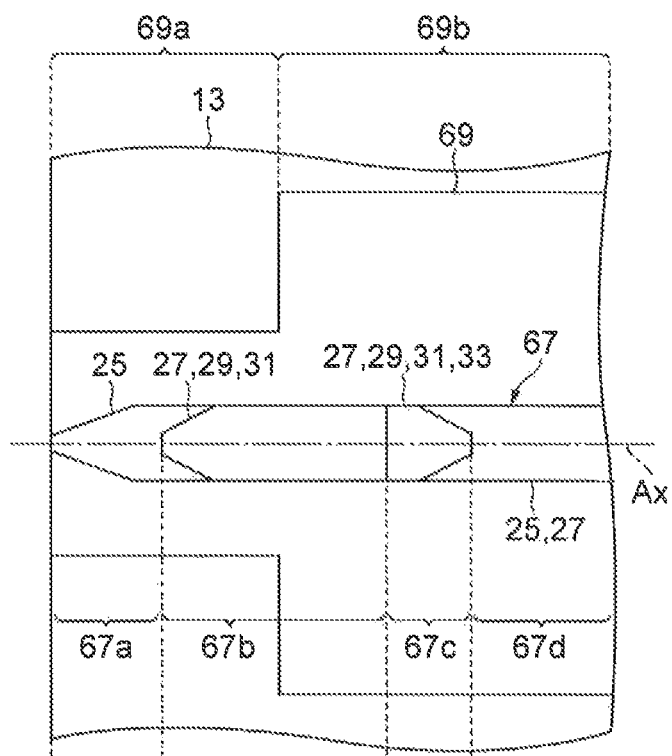
FIGS. 20A and 20B are views illustrating a shape of a waveguide in a semiconductor optical device (spot size converter) manufacturing method.
Figure 20B:
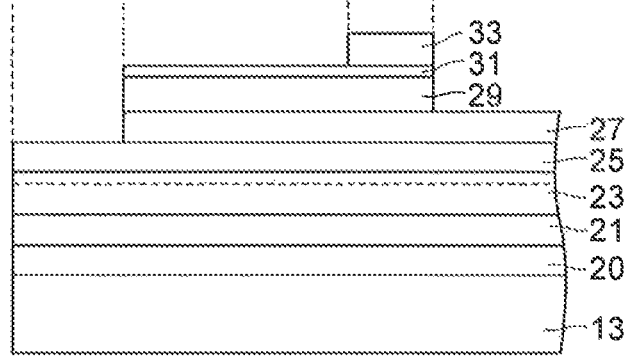

FIGS. 20A and 20B are views illustrating the upper mesa 67 and the lower mesa 69. FIG. 20A shows the upper mesa 67 and the lower mesa 69 disposed on the first region 13a, the second region 13b, the third region 13c and the fourth region 13d of the substrate 13. FIG. 20B shows a cross section taken along the axis Ax in FIG. 20A. The lower mesa 69 includes a first lower mesa 69a having a first width, and a second lower mesa 69b having a second width. The first lower mesa 69a and the second lower mesa 69b are arranged along the axis Ax. The first width of the first lower mesa 69a is determined to match the mode field diameter of an external optical waveguide such as an optical fiber. In this embodiment, the second width of the second lower mesa 69b is larger than the first width of the first lower mesa 69a. The first lower mesa 69a has a width of 3 µm and a height of 1.8 µm, for example. The upper mesa 67 has a width of 1.5 µm and a height of 3.2 µm, for example.

Through the steps described above, the main structure of the SSC is formed.

According to the semiconductor optical device manufacturing method, the upper mesa 67 and the lower mesa 69 having a larger width than the upper mesa 67 are formed on the first region 13a and the second region 13b of the substrate 13. Further, the first mesa portion 67a, the second mesa portion 67b, the third mesa portion 67c and the fourth mesa portion 67d are formed on the first region 13a, the second region 13b, the third region 13c and the fourth region 13d of the substrate 13, respectively. In this structure, the first mesa portion 67a includes the upper core layer 25, and the second mesa portion 67b includes the upper core layer 25, the first upper region 27, the second upper region 29 and the contact layer 31. This configuration thus allows for the transition of light from one of the upper mesa 67 and the lower mesa 69 to the other.

Optical loss caused by light transition between the first mesa portion 67a and the second mesa portion 67b has wavelength dependency. The third mesa portion 67c includes the upper core layer 25, the first upper region 27, the second upper region 29, the contact layer 31 and the cap layer 33. On the other hand, the fourth mesa portion 67d includes the upper core layer 25 and the first upper region 27. In addition, the first upper region 27 includes a non-doped semiconductor layer and the second upper region 29 includes a p-type semiconductor layer. In this structure, the third mesa portion 67c and the fourth mesa portion 67d have different wavelength dependency characteristics in optical loss for light propagated through the third mesa portion 67c and the fourth mesa portion 67d. The third mesa portion 67c has a larger wavelength dependency of the optical loss than that of the fourth mesa portion 67d. That is, the optical absorption coefficient of the third mesa portion 67c greatly depends on the wavelength as compared to the fourth mesa portion 67d. This difference of the wavelength dependency characteristics in optical loss between the third mesa portion 67c and the fourth mesa portion 67d is caused by the structural difference between the third mesa portion 67c and the fourth mesa portion 67d. The third mesa portion 67c includes both the first upper region 27 and the second upper region 29. On the other hand, the fourth mesa portion 67d includes the first upper region 27 and does not include the second upper region 29. The wavelength dependency of optical loss during the light transition in the semiconductor optical device is adjusted by utilizing the difference in the wavelength dependencies of the optical absorption coefficients between the third mesa portion 67c and the fourth mesa portion 67d.

Figure 21A:
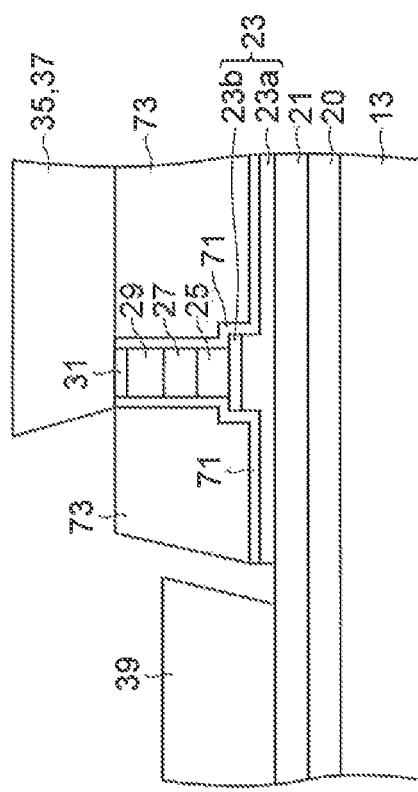
Figure 21B:
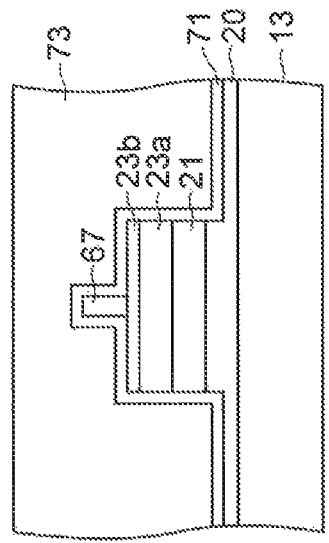

Subsequent steps are performed in order to fabricate a MZ optical modulator. After the etching of the lower mesa 69, an n-side electrode of the MZ optical modulator is formed. First, the intermediate layer 23 is etched until at least the etching reaches to the middle of the n-type InP layer (intermediate cladding layer 23a) of the intermediate layer 23. For example, the etchant used in this dry etching contains chlorine. This etching produces an opening in the fifth region 13c through the ninth region 13i of the substrate 13. After this formation of the opening, an insulating protective film 71 is deposited onto the entire surface of the substrate 13. For example, this protective film 71 includes a silicon oxide (SiO$_2$) film or a silicon nitride (SiN) film. On the protective film 71, a resin is applied. The resin is applied not only to the MZ optical modulator but also to the SSC. After the application of the resin, the resin is cured by heat treatment to form a cured resin 73. For the formation of an n-side electrode 39 and p-side electrodes 35 and 37, the cured resin 73 is dry etched to form a contact opening in the cured resin 73. In the dry etching for the formation of the contact opening, the protective film 71 and the cured resin 73 are removed. The doped semiconductor layer is exposed through the contact opening. Ohmic electrodes as the n-side electrode 39 and the p-side electrodes 35 and 37 are formed in the contact opening. Then-side electrode 39 and the p-side electrodes 35 and 37 are in contact with the doped semiconductor layer through the contact opening. For example, the p-side electrodes 35 and 37 have a width of 4 µm and a thickness of 3 µm, and the n-side electrode 39 has a thickness of 3 82 m. As illustrated in FIGS. 21A and 21B, the above steps result in a MZ optical modulator. FIG. 21A illustrates a cross section of the MZ optical modulator. FIG. 21B illustrates a cross section of the SSC optically coupled to the MZ optical modulator.

Figure 22A:
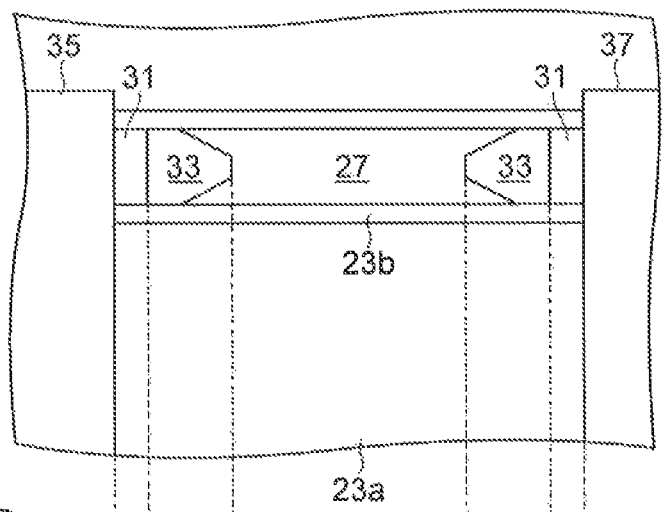
FIGS. 22A and 22B are views illustrating a shape of a waveguide in a semiconductor optical device (MZ modulator) manufacturing method.
Figure 22B:
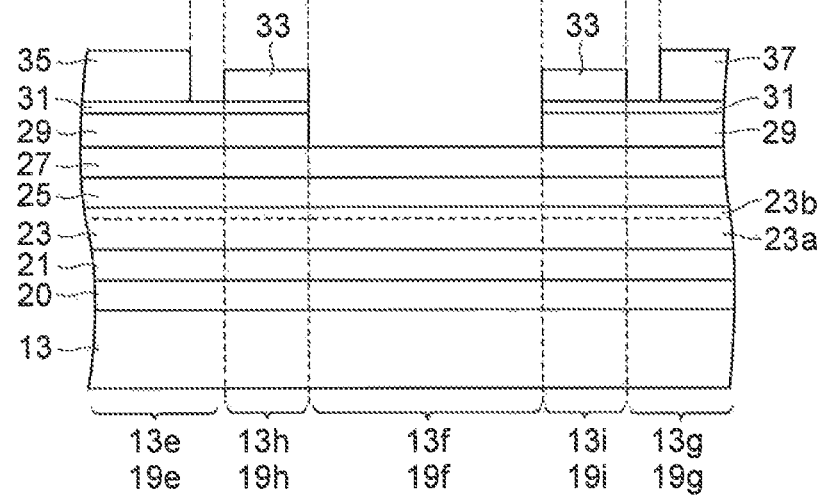

FIGS. 22A and 22B are a plan view and a sectional view, respectively, of the MZ optical modulator. The fifth mesa portion 19e, the eighth mesa portion 19h, the sixth mesa portion 19f, the ninth mesa portion 19i and the seventh mesa portion 19g are sequentially arranged on the fifth region 13e, the eighth region 13h, the sixth region 13f, the ninth region 13i and the seventh region 13g of the substrate 13, respectively. The fifth mesa portion 19e includes the upper core layer 25, the first upper region 27, the second upper region 29 and the contact layer 31. The modulation electrode 35 is disposed on the fifth mesa portion 19e and is in contact with the uppermost layer (for example, the contact layer 31) of the fifth mesa portion 19e. The seventh mesa portion 19g includes the upper core layer 25, the first upper region 27, the second upper region 29 and the contact layer 31. The phase-shifting electrode 37 is disposed on the seventh mesa portion 19g and is in contact with the uppermost layer (for example, the contact layer 31) of the seventh mesa portion 19g The sixth mesa portion 19f includes the upper core layer 25 and the first upper region 27. The eighth mesa portion 19h includes the upper core layer 25, the first upper region 27, the second upper region 29, the contact layer 31 and the cap layer 33. The ninth mesa portion 19i includes the upper core layer 25, the first upper region 27, the second upper region 29, the contact layer 31 and the cap layer 33. The fifth mesa portion 19e and the seventh mesa portion 19g that constitute the modulator are fabricated similarly to the second mesa portion 19b constituting the SSC. The sixth mesa portion 19f that constitutes the modulator is fabricated similarly to the fourth mesa portion 19d constituting the SSC. The eighth mesa portion 19h and the ninth mesa portion 19i are fabricated similarly to the third mesa portion 19c constituting the SSC.

A semiconductor optical device will be described in which SSCs and a MZ modulator are integrated on a semiconductor substrate. As will be understood from the foregoing description and also as illustrated in FIGS. 1A and 1B, the SSCs are optically coupled to both sides of the MZ modulator. The MZ modulator includes MMI couplers, modulation arm sections, device isolating sections, and phase-shifting sections. At an optically coupled portion between the MZ modulator and the SSC, a loss adjustment section is disposed that adjusts the wavelength dependency of optical loss. For example, the external optical waveguide such as the optical fiber coupled to the semiconductor optical device has the mode diameter of approximately 2 μm. On the other hand, the semiconductor optical waveguide has the mode diameter of approximately 1 μm. The SSCs are used to convert these mode diameters.

The loss adjustment sections are provided in order to adjust the wavelength dependency of the optical loss. The length of a p-type upper cladding layer is adjusted by utilizing the fact that the optical loss in the p-type upper cladding layer has wavelength dependency. In this manner, the wavelength dependency of the optical loss may be changed. The optical loss is increased with increasing proportion of the p-type upper cladding layer in the loss adjustment section. The loss adjustment sections are effective in applications where the wavelength dependency of optical loss is to be reduced.

Referring back to FIGS. 1A and 1B, light is divided at the MMI coupler in the MZ modulator. The divided lights are guided to the optical modulation sections through two arm waveguides. Electrical signals having different voltages are applied to the two modulation sections. The refractive indices of the waveguides of the modulation sections are changed in accordance with the electrical signals, causing changes in the phases of lights guided therethrough. The two lights having respective phases modulated at the two modulation sections are multiplexed at the MMI coupler on the other side. The multiplexed light has an intensity and a phase that have been modulated in accordance with the electrical signals. The MMI coupler on the other side is optically coupled to a light output section. At the light output section, the optical mode diameter of the optical waveguide that is approximately 1 μm is expanded to a mode diameter of 2 μm by the SSC. The signal light having the modulated intensity and phase is obtained through the light output section. The device isolating sections in the MZ modulator are provided in order to strengthen the confinement of the electric field within the modulation sections in the waveguide direction. With the device isolating section, the leakage of electric field may be reduced and the modulator may realize favorable modulation characteristics.

In the semiconductor optical device according to the present embodiment, the loss adjustment sections are disposed inside the SSCs or in the exterior of the SSC. In the loss adjustment sections, the proportions of a portion including the p-type upper cladding layer and a portion not including the p-type upper cladding layer are changed. In this manner, the wavelength dependency of the optical loss of the semiconductor optical device as a whole may be adjusted. This effect utilizes the fact that the optical loss of the non-doped upper cladding layer is negligibly small compared to the optical loss of the p-type upper cladding layer. In the manufacturing method according to the present embodiment, the taper end on one side of the p-type upper cladding layer and the p-type contact layer is formed on the non-doped upper cladding layer, and the cap layer remains in the tapered portion at this location. By designing, the length of this portion may be adjusted. For example, the length of this portion may be shortened. In addition, the taper end on the other side of the p-type upper cladding layer and the p-type contact layer is formed on the upper core, and there is no cap layer remaining in this location.

FIGS. 23A to 23C show exemplary sizes of the main features in the semiconductor optical device according to the present embodiment. When the width of the taper end of the upper core in the SSC is, for example, 0.5 μm or less, light is allowed to easily transition from the upper core to the lower core and the optical coupling loss may be decreased. The taper end width of the p-type upper cladding layer in the SSC is preferably 0.5 μm or less. In such a case, the light transition from the upper core to the lower core is facilitated and the optical coupling loss may be decreased. The thickness of the cap layer is preferably substantially equal to the non-doped upper cladding layer. In order to obtain good modulation operations by the electric field applied to the upper core layer, the non-doped upper cladding layer has a thickness of not more than 1 μm. To avoid the absorption of light by the p-type upper cladding layer, the thickness of the non-doped upper cladding layer is not less than 0.2 μm. The optical loss in the non-doped upper cladding layer is negligibly small as compared to the p-type upper cladding layer. The thickness of the upper core layer is approximately 0.2 to 1 μm and the band gap wavelength of the upper core layer is approximately 1.3 to 1.5 μm. Within these ranges, an electric field may be favorably applied to the upper core layer and also the light may be favorably confined within the upper core layer, and good modulation characteristics may be obtained. To obtain good light transition between the upper core layer and the lower core layer in the SSC, the thickness of the n-type intermediate cladding layer is approximately 0 to 2 μm. To obtain good light transition between the upper core layer and the lower core layer in the SSC, the thickness and the band gap wavelength of the n-type lower core layer are approximately 0.01 to 5 μm and approximately 1.0 to 1.3 μm, respectively. To obtain good modulation characteristics by decreasing the amount of leakage current passing between the phase-shifting section and the modulation section in the MZ modulator, the length of the device isolating section is approximately 100 to 1000 μm.

Figure 24:
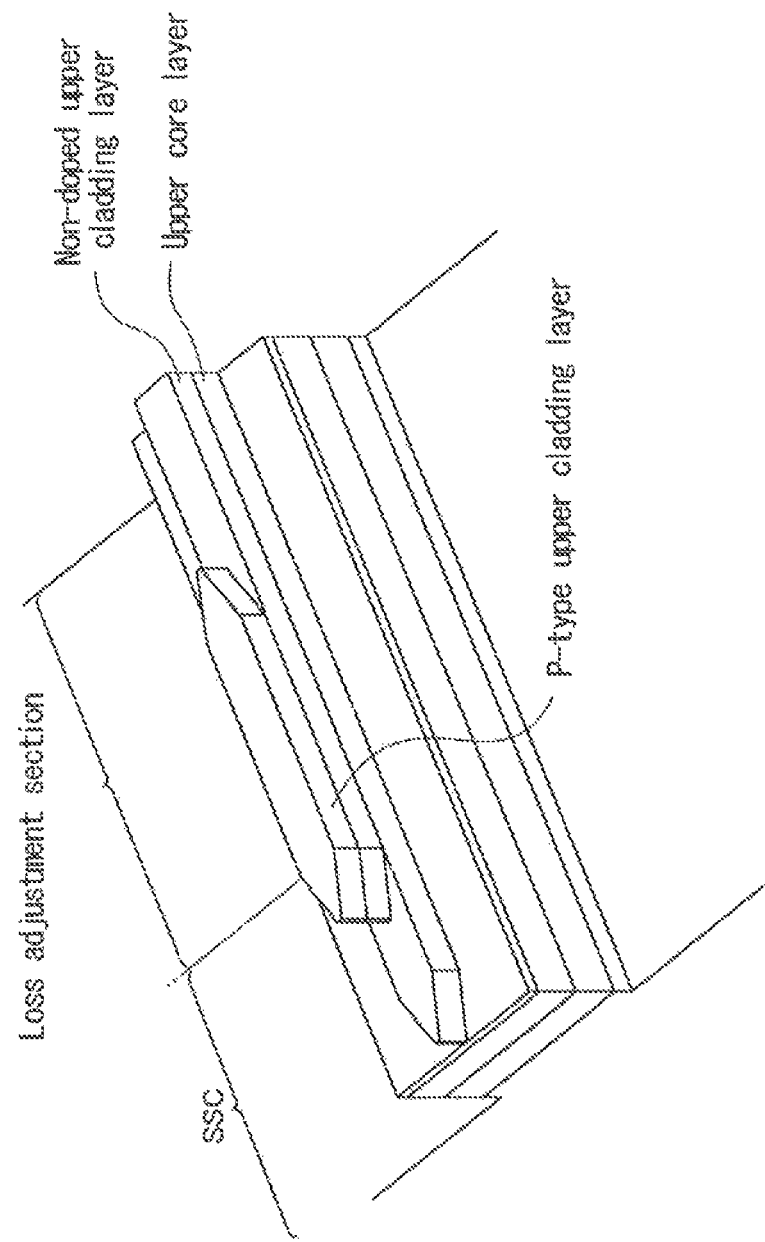
FIG. 24 is a view illustrating a structure of a test device A used to test the adjustment of loss characteristics.
Figure 25:
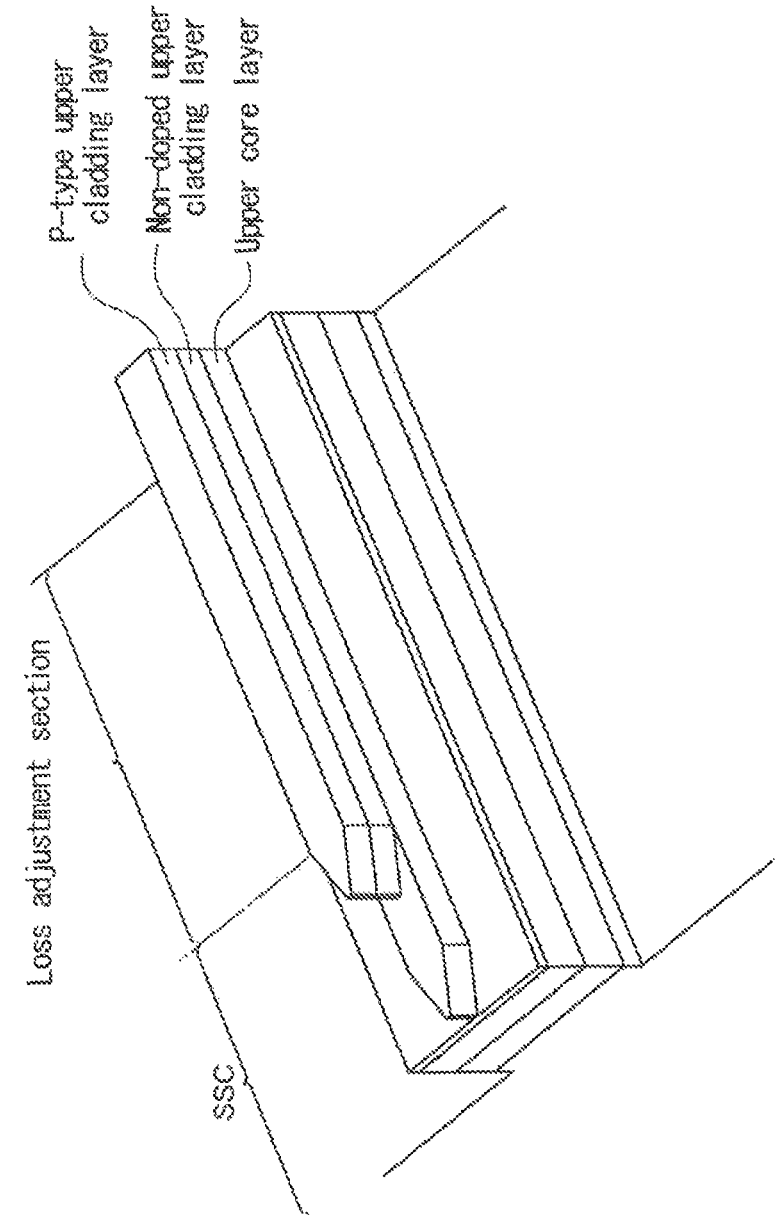
FIG. 25 is a view illustrating a structure of a test device B used to test the adjustment of loss characteristics.
Figure 26:
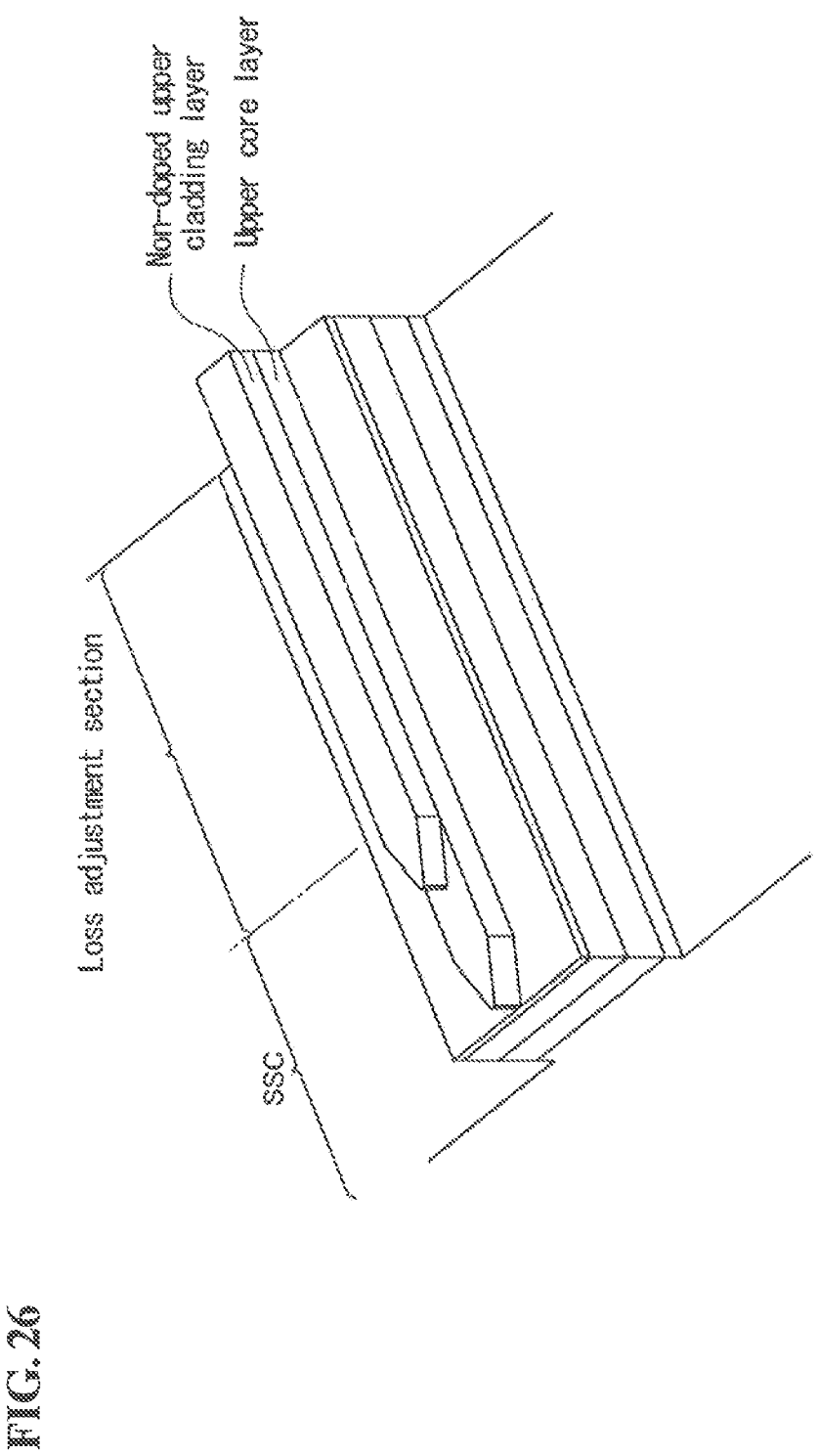
FIG. 26 is a view illustrating a structure of a test device C used to test the adjustment of loss characteristics.

A method for adjusting loss characteristics will be described. FIGS. 24, 25 and 26 illustrate structures of test devices used to test the adjustment of loss characteristics. The test devices have a linear waveguide including a SSC and a loss adjustment section. Referring to FIG. 24, the structure of the test device A is illustrated. In the test device A, the loss adjustment section has the ratio of the length LA1 of the portion having a p-type upper cladding layer to the length LA2 of the portion without the p-type upper cladding layer (LA1/LA2) of ½. Referring to FIG. 25, the structure of the test device B is illustrated. In the test device B, a p-type upper cladding layer is disposed on the entirety of the loss adjustment section. Referring to FIG. 26, the structure of the test device C is illustrated. In the test device C, a p-type upper cladding layer is not formed in the entirety of the loss adjustment section.

Figure 27:
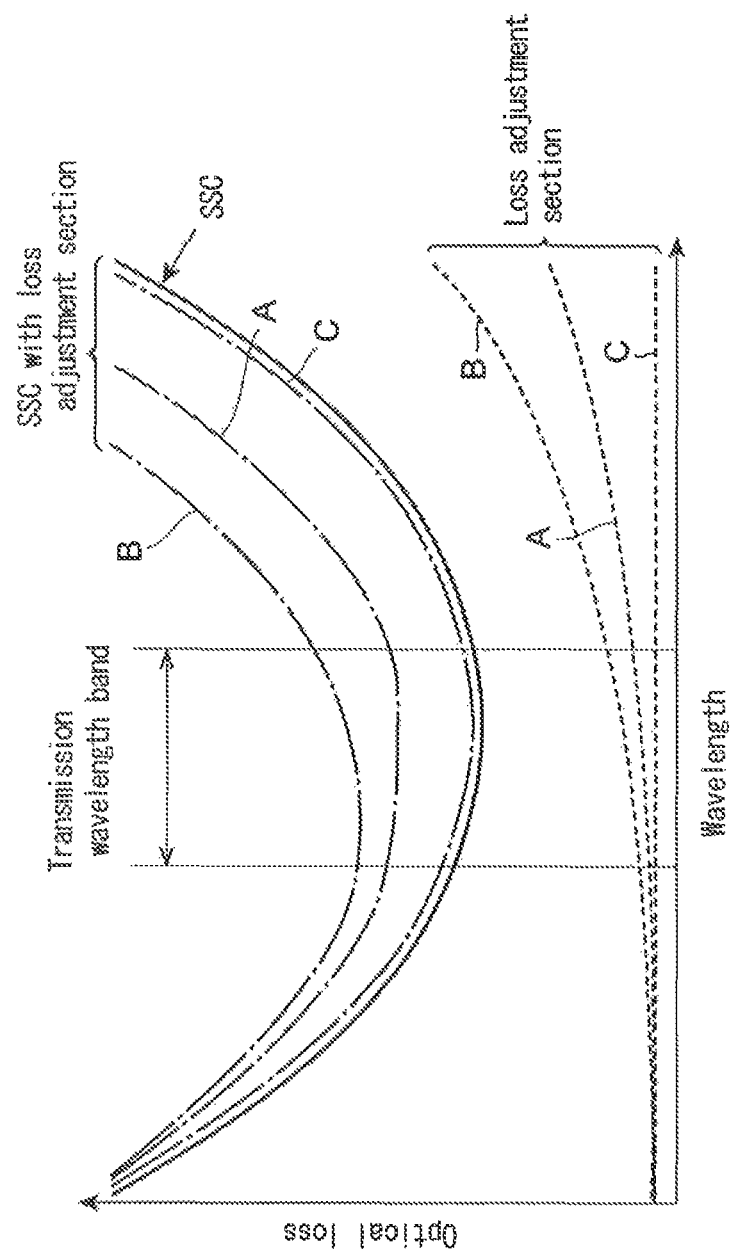
FIG. 27 is a diagram illustrating results of optical losses calculated with respect to the test devices A, B and C.

To demonstrate that the wavelength dependency of the optical loss may be adjusted by controlling the length of the mesa, the optical losses in the test devices A, B and C are calculated. FIG. 27 shows the results of the calculation of the optical losses in the test devices A, B and C. The vertical axis of FIG. 27 represents optical loss. The horizontal axis of FIG. 27 represents wavelength. In FIG. 27, the optical loss is plotted in the range of wavelength band from 1.46 μm to 1.64 μm. The dashed-dotted lines A, B and C indicate the calculated results of the wavelength dependency of the optical loss for the test devices A, B and C, respectively. The solid line indicates the result of the wavelength dependency of the optical loss calculated with respect to the SSC alone.

The SSC has shown characteristics in which the optical loss is smaller on the long wavelength side in the range of wavelengths used. Here, the difference in the optical loss depending on wavelengths is 0.5 dB. The dashed lines A, B and C indicate the calculated results of wavelength dependency of the optical loss in the case of the loss adjustment sections alone for the test devices A, B and C, respectively (the optical loss in the optical waveguide without the SSC).

It has been shown that the optical loss is increased as the proportion of the waveguide having the p-type upper cladding layer increases. Further, the optical loss is increased on the long wavelength side. The reasons for these results are as follows. In the case of a p-type semiconductor layer doped with, for example, zinc (Zn) as the p-type impurity, the optical absorption loss is increased. This absorption loss is increased with increasing concentration of the p-type impurity doped in the p-type semiconductor layer. On the other hand, the transverse mode diameter is increased as the wavelength is longer. Consequently, the distribution of light to the p-type upper cladding layer is increased. As a result, the optical loss is higher on the long wavelength side. When the proportion of the waveguide having the p-type upper cladding layer is increased, the optical loss is also increased because the p-type upper cladding layer has a large optical absorption loss for light propagating in the optical waveguide. Referring to the dashed-dotted lines A, B and C in FIG. 27, in accordance with the configuration of the loss adjustment section connected to the SSC, an optical loss is further added to the optical loss ascribed to the SSC, resulting in an increase in the optical loss of the entire structure. In the test device A, the difference in the optical loss is as small as 0.05 dB in the transmission wavelength band of 1.53 μm to 1.57 μm.

As demonstrated above, the optical loss is increased as the length of the p-type upper cladding layer represents a larger proportion. Further, the optical loss in the p-type upper cladding layer has wavelength dependency. The wavelength dependency of the optical loss is adjusted by utilizing the optical loss characteristics of the p-type upper cladding layer. In the embodiment, a substantially constant optical loss is obtained in the transmission wavelength band for the test device A by adjusting the ratio of the length LA1 of the portion having a p-type upper cladding layer to the length LA2 of the portion without the p-type upper cladding layer (LA1/LA2) in the loss adjustment section. Furthermore, when the optical loss characteristics in which the optical loss is increased with longer wavelengths is required for the semiconductor optical device, the proportion of the waveguide having a p-type upper cladding layer is increased based on the data of the test device B.

According to the manufacturing method in the present embodiment, semiconductor optical devices including SSCs, device isolating sections, modulation sections and phase-shifting sections may be manufactured through simple steps while fabricating the features with good accuracy. Even when the wavelength dependency of the optical loss in the SSC is different from the desired characteristics, the device as a whole may achieve the desired loss characteristics.

The scope of the invention is not limited to any of the specific configurations disclosed in the embodiments.

What is claimed is:

1. A method for manufacturing a semiconductor optical device, comprising the steps of:

preparing a substrate having a first region, a second region, a third region and a fourth region arranged in the direction of a waveguide axis;

growing a stacked semiconductor layer on the first region, the second region, the third region and the fourth region of the substrate, the stacked semiconductor layer including a lower core layer, an intermediate layer, an upper core layer, a first upper region including a non-doped semiconductor layer, a second upper region including a p-type semiconductor layer, and a cap layer;

forming a first mask on the stacked semiconductor layer;

forming an upper mesa by etching the stacked semiconductor layer using the first mask until the intermediate layer is exposed, the upper mesa including the upper core layer;

selectively etching the cap layer in the upper mesa on the first region and the second region;

after etching the cap layer, forming a second mask on the upper mesa in the second region and the third region of the substrate, the second mask having an opening on the upper mesa in the first region and the fourth region;

etching the upper mesa by a dry etching method using the second mask so as to form a first mesa portion, a second mesa portion, a third mesa portion and a fourth mesa portion on the first region, the second region, the third region and the fourth region, respectively; and forming a lower mesa by etching the lower core layer, the lower mesa having a width larger than a width of the upper mesa, wherein, in the step of etching the upper mesa, the first mesa portion on the first region is formed by etching the first upper region and the second upper region, the second mesa portion on the second region is formed by etching the first upper region and the second upper region through the second mask, the third mesa portion on the third region is formed by etching the second upper region and the cap layer through the second mask, and the fourth mesa portion on the fourth region is formed by etching the second upper region and the cap layer.

2. The method for manufacturing a semiconductor optical device according to claim 1, wherein the cap layer includes a semiconductor material different from a semiconductor material of the semiconductor layer immediately below the cap layer, and the step of selectively etching the cap layer in the upper mesa includes the steps of:

after forming the upper mesa, forming an insulating film on a side surface and a top surface of the upper mesa in the first region, the second region, the third region and the fourth region, and on the substrate;

forming an insulating film mask by etching the insulating film on the top surface of the upper mesa in the first region and the second region of the substrate by using an anisotropic dry etching method without an etching mask, the insulating film mask having an opening on the upper mesa in the first region and the second region of the substrate; and selectively etching the cap layer in the upper mesa on the first region and the second region using the insulating film mask.

3. The method for manufacturing a semiconductor optical device according to claim 2, wherein the stacked semiconductor layer further includes a contact layer on the second upper region, the cap layer is formed on the contact layer, the cap layer is made of InP, the contact layer is made of GaInAs or GaInAsP, and in the step of etching the cap layer, the cap layer is selectively etched by a wet etching method.

4. The method for manufacturing a semiconductor optical device according to claim 3, wherein the cap layer is selectively etched by using a hydrochloric acid-containing aqueous solution as an etchant.

5. The method for manufacturing a semiconductor optical device according to claim 1, further comprising the steps of:

after etching the cap layer and before etching the upper mesa, forming a dummy buried region on a side surface and a top surface of the upper mesa, and on the substrate, the dummy buried region including a material other than semiconductors;

forming a resist mask on the dummy buried region, the resist mask having a pattern on the upper mesa in the second region and the third region, the resist mask having an opening on the upper mesa in the first region and fourth region; and etching the dummy buried region by using the resist mask so as to form the second mask on the second region and the third region of the substrate, wherein the second mask includes an etched dummy buried region, and the etched dummy buried region of the second mask on the second region has a different thickness from a thickness of the etched dummy buried region of the second mask on the third region.

6. The method for manufacturing a semiconductor optical device according to claim 5, wherein the dummy buried region is made of spin on glass.

7. The method for manufacturing a semiconductor optical device according to claim 1, wherein, in the step of forming the second mask, the second mask on the upper mesa in the second region has a thickness larger than the thickness of the second mask on the upper mesa in the third region.

8. The method for manufacturing a semiconductor optical device according to claim 1, wherein the first upper region in the stacked semiconductor layer has a thickness substantially equal to the thickness of the cap layer.

9. A semiconductor optical device comprising:

a substrate having a first region, a second region, a third region and a fourth region arranged in the direction of a waveguide axis;

a lower mesa disposed on the first region, the second region, the third region and the fourth region of the substrate, the lower mesa including a lower core layer, the lower mesa having an end facet configured to be optically coupled to an external optical waveguide;

a first mesa portion disposed on the first region, the first mesa portion including an upper core layer disposed on the lower core layer, the upper core layer being optically coupled to the lower core layer;

a second mesa portion disposed on the second region, the second mesa portion including the upper core layer, a first upper region disposed on the upper core layer, and a second upper region disposed on the first upper region;

a third mesa portion disposed on the third region, the third mesa portion including the upper core layer, the first upper region, the second upper region, and a cap layer disposed on the second upper region; and a fourth mesa portion disposed on the fourth region, the fourth mesa portion including the upper core layer and the first upper region, wherein the first, second, third, and fourth mesa portions constitute an upper mesa having a width smaller than a width of the lower mesa, the first upper region in the second and third mesa portions includes a non-doped semiconductor layer, and the second upper region in the second and third mesa portions includes a p-type semiconductor layer doped with a p-type impurity.

10. The semiconductor optical device according to claim 9, wherein the lower mesa and the upper mesa constitute a spot size converter disposed on the first region, the second region, the third region and the fourth region of the substrate.

11. The semiconductor optical device according to claim 9, wherein, in the second mesa portion, the first upper region and the second upper region on the upper core layer include a tapered portion having a width continuously decreasing in the direction of the waveguide axis, and a stripe portion having a constant width.

12. The semiconductor optical device according to claim 9, wherein, in the third mesa portion, the second upper region and the cap layer on the second upper region include a tapered portion having a width continuously decreasing in the direction of the waveguide axis, and a stripe portion having a constant width.

13. The semiconductor optical device according to claim 9, wherein the third mesa portion including the first upper region and the second upper region has a dependency of an optical absorption coefficient on wavelength which is different from that of the fourth mesa portion including the first upper region.

14. The semiconductor optical device according to claim 9, further comprising:

a fifth mesa portion including the upper core layer, the first upper region and the second upper region;

a sixth mesa portion including the upper core layer and the first upper region; and a seventh mesa portion including the upper core layer, the first upper region and the second upper region, wherein the substrate has a fifth region, a sixth region and a seventh region arranged in the direction of the waveguide axis, the fifth mesa portion, the sixth mesa portion, and the seventh mesa portion are disposed on the fifth region, the sixth region, and the seventh region, respectively, and the fifth mesa portion is optically coupled to the seventh mesa portion through the sixth mesa portion.

15. The semiconductor optical device according to claim 14, wherein the lower mesa and the upper mesa that is disposed on the first region, the second region, the third region, and the fourth region of the substrate constitute a spot size converter, the fifth mesa portion, the sixth mesa portion, and the seventh mesa portion constitute an optical modulator optically coupled to the spot size converter.

16. The semiconductor optical device according to claim 15, further comprising:

a modulation electrode of the optical modulator disposed on the fifth mesa portion; and a phase-shifting electrode of the optical modulator disposed on the seventh mesa portion, wherein the fifth mesa portion includes a contact layer disposed between the second upper region and the modulation electrode; and the seventh mesa portion includes the contact layer disposed between the second upper region and the phase-shifting electrode.

* * * * *